US011952242B2

(12) United States Patent

Yoshizawa et al.

(10) Patent No.: US 11,952,242 B2
(45) Date of Patent: Apr. 9, 2024

(54) GUIDING DEVICE, GUIDING METHOD, AND ELEVATOR

(71) Applicant: Mitsubishi Electric Corporation, Tokyo (JP)

(72) Inventors: Hitoshi Yoshizawa, Tokyo (JP); Masato Hirai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1386 days.

(21) Appl. No.: 16/335,018

(22) PCT Filed: Oct. 24, 2016

(86) PCT No.: PCT/JP2016/081395

§ 371 (c)(1),
(2) Date: Mar. 20, 2019

(87) PCT Pub. No.: WO2018/078681

PCT Pub. Date: May 3, 2018

(65) Prior Publication Data

US 2019/0248623 A1 Aug. 15, 2019

(51) Int. Cl.
*B66B 3/00* (2006.01)
*B66B 1/28* (2006.01)
(Continued)

(52) U.S. Cl.
CPC ................ *B66B 3/002* (2013.01); *B66B 1/28* (2013.01); *B66B 3/00* (2013.01); *B66B 3/02* (2013.01); *B66B 13/14* (2013.01); *B66B 13/30* (2013.01)

(58) Field of Classification Search
CPC .. B66B 3/002; B66B 1/28; B66B 3/00; B66B 3/02; B66B 13/14; B66B 13/30; B66B 1/468; B66B 3/006
See application file for complete search history.

(56) References Cited

U.S. PATENT DOCUMENTS

| | | | | |
|---|---|---|---|---|
| 5,042,620 | A | 8/1991 | Yoneda et al. | |
| 2016/0337626 | A1* | 11/2016 | Mima .................. | H04N 9/3194 |

(Continued)

FOREIGN PATENT DOCUMENTS

| | | |
|---|---|---|
| JP | 55-125271 | 9/1980 |
| JP | 64-2983 A | 1/1989 |

(Continued)

OTHER PUBLICATIONS

Office Action issued in corresponding Korean Patent Application No. 2019-7010468, dated Aug. 20, 2019, with a Machine translation thereof.

(Continued)

*Primary Examiner* — Jeffrey Donels
(74) *Attorney, Agent, or Firm* — BIRCH, STEWART, KOLASCH & BIRCH, LLP

(57) ABSTRACT

A guiding device according to the present invention generates and displays guidance information for displaying a sequence of operation states of an elevator on a three-sided frame corresponding to the car responding to a call for the elevator or the periphery of the three-sided frame. The sequence of operation state of the elevator includes the position of the lobby corresponding to the car number of the car selected from among a plurality of cars in response to the call for the elevator, the movement of the car of the elevator, the arrival direction of the car, a situation where the car arrives at the calling floor and the door opens, a situation where the door is fully open and starts closing, and a situation where the door is closing. Thus, a user in the lobby can intuitively determine the complicated sequence of operation states of the elevator.

19 Claims, 9 Drawing Sheets

(51) Int. Cl.

| | |
|---|---|
| ***B66B 3/02*** | (2006.01) |
| ***B66B 13/14*** | (2006.01) |
| ***B66B 13/30*** | (2006.01) |

(56) References Cited

U.S. PATENT DOCUMENTS

| | | | | |
|---|---|---|---|---|
| 2018/0111792 A1* | 4/2018 | Schach | .................... | B66B 1/468 |
| 2021/0192099 A1* | 6/2021 | Benromano | ........... | G06Q 10/06 |

FOREIGN PATENT DOCUMENTS

| | | | | |
|---|---|---|---|---|
| JP | 1-123677 U | 8/1989 | | |
| JP | 2-86583 A | 3/1990 | | |
| JP | 7-172721 A | 7/1995 | | |
| JP | 9-278300 A | 10/1997 | | |
| JP | 2004-269217 A | 9/2004 | | |
| JP | 2005-314070 A | 11/2005 | | |
| JP | 2008-265947 A | 11/2008 | | |
| JP | 2009-096584 A | 5/2009 | | |
| JP | 2011-46468 A | 3/2011 | | |
| WO | WO-2015124826 A1 * | 8/2015 | ............. | B66B 3/002 |
| WO | WO-2020194368 A1 * | 10/2020 | | |
| WO | WO-2023073277 A1 * | 5/2023 | | |

OTHER PUBLICATIONS

International Search Report issued in PCT/JP2016/081395 (PCT/ISA/210), dated Jan. 24, 2017.
Notification of Reasons for Refusal, Japanese Office Action for Japanese Application No. JP 2017-161714, dated Jul. 10, 2018.
Notification of Reasons for Refusal, Japanese Office Action for Japanese Application No. JP 2017-525427, dated Jul. 4, 2017.

* cited by examiner

FIG. 7-1
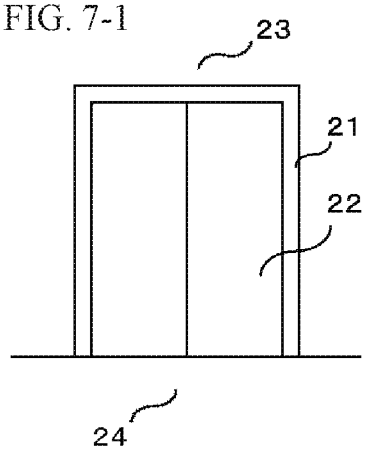
FIG. 7-2a
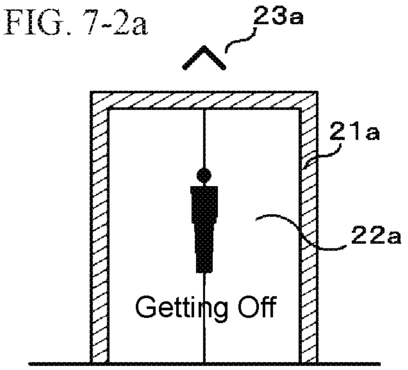
FIG. 7-2b1
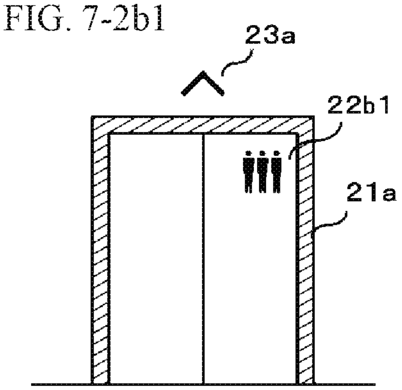
FIG. 7-2b2
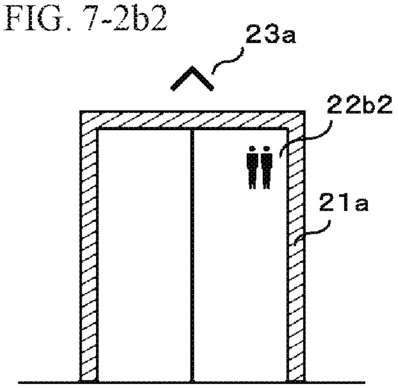
FIG. 7-3a
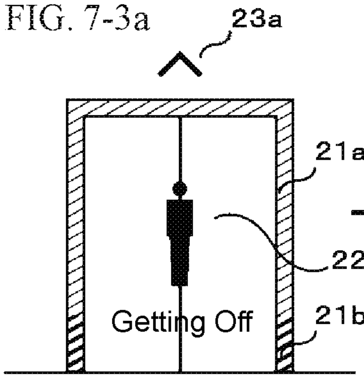
FIG. 7-3b
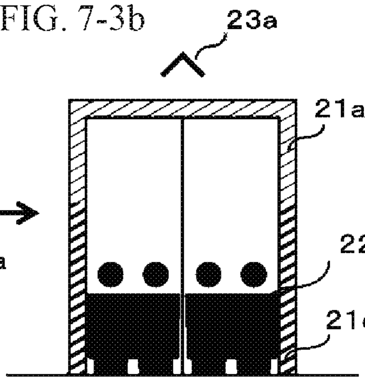
FIG. 7-3c
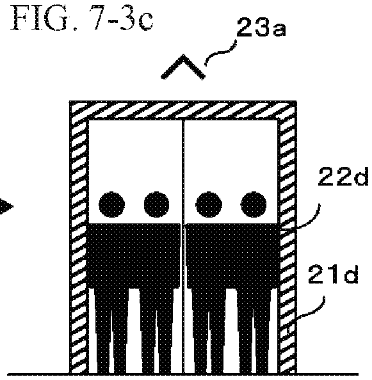

FIG. 9-1
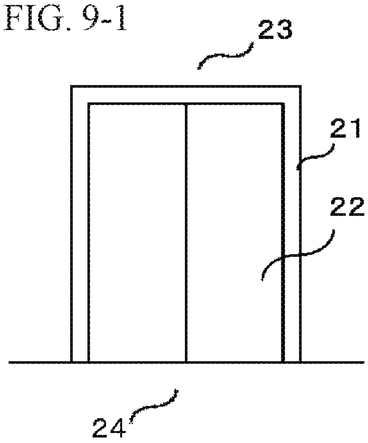
FIG. 9-2a
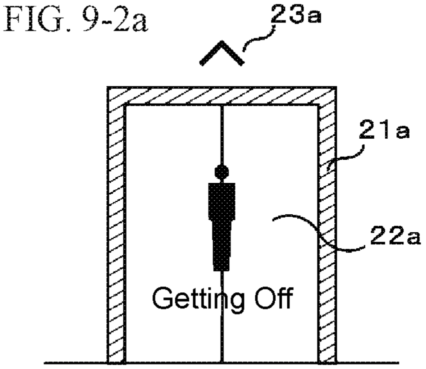
FIG. 9-2b1
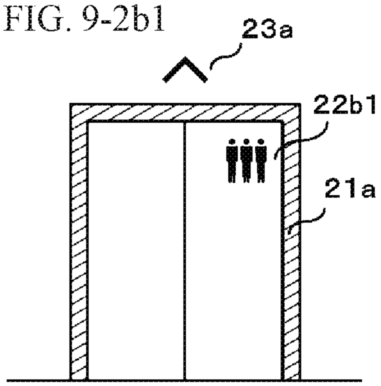
FIG. 9-2b2
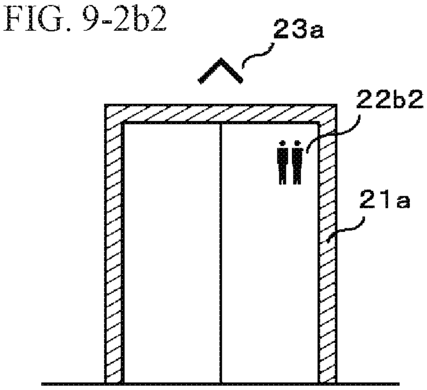
FIG. 9-3a
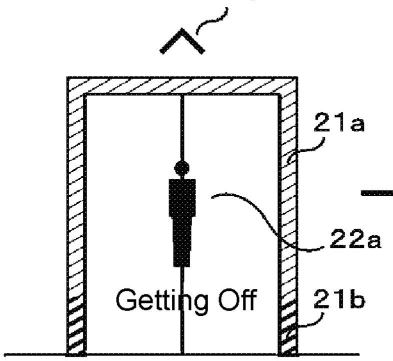
FIG. 9-3b
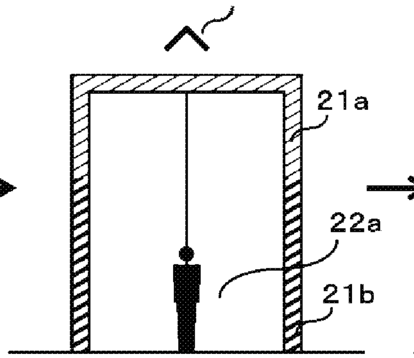
FIG. 9-3c
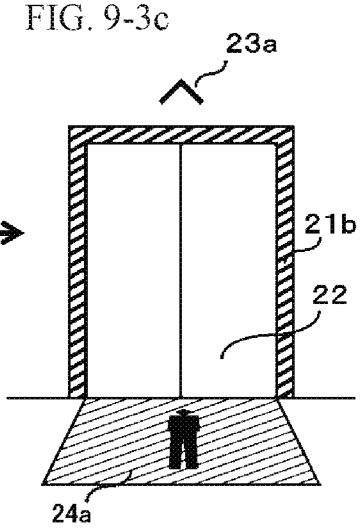

GUIDING DEVICE, GUIDING METHOD, AND ELEVATOR

TECHNICAL FIELD

The present invention relates to a guiding device that informs a user in an elevator lobby of an operation state of an elevator and a state in an elevator car, a guiding method, and an elevator.

BACKGROUND ART

There is a sequence of operation states of an elevator, including registration of a call for the elevator, selection of the car responding to the call from among cars, movement of the elevator car, and opening and closing of the door when the car arrives at the calling floor.

Conventional techniques for notifying a user in an elevator lobby of an operation state of an elevator include up/down buttons, indicators, hall lanterns, sound, voice guidance, and the like. Therefore, to check the operation state of the elevator, it is necessary to check each of the above-mentioned devices and determine the operation state. Display of a state of movement of an elevator car on a wall surface and a floor is disclosed as a method for displaying an operation state of an elevator in Patent Literature 1.

Patent Literature 1: JP 2008-265947 A

SUMMARY OF INVENTION

Technical Problem

However, an elevator has various operation states including checking the position of a car responding to a call, checking from which direction the car is coming and what position the car has reached, arrival of the car at the calling floor, and opening and closing of the doors. Therefore, the information disclosed in Patent Literature 1 is not sufficient in giving guidance showing a sequence of operation states of an elevator, including selecting the car responding to a call from among a plurality of cars, and opening and closing of the doors when the car arrives.

The present invention has been made to solve the above problem, and aims to clearly present a complicated sequence of operation states of an elevator to a user.

Solution to Problem

A guiding device according to one aspect of the present invention comprises: control means for generating guidance information for displaying a first light on a three-sided frame or on a periphery of the three-sided frame placed at an opening of entrance to a car responding to a call when the car responding to the call is selected, displaying a second light on the three-sided frame or the periphery of the three-sided frame making correspondence with a relative position of the car from a position of the car responding to the call to a calling floor and an arrival direction of the car when the car moves, and emphasizing to display the second light on the three-sided frame or on the periphery of the three-sided frame when the car responding to the call arrives at the calling floor and a door in a lobby of the car responding to the call is opened, using operation information of the car responding to the call of an elevator and open/close information of the door of the elevator which are input from a car moving device controlling the car of the elevator; and display means for outputting the guidance information to a display device displaying the guidance information.

A guiding device according to another aspect of the present invention comprises: control means for generating guidance information for displaying a first light on a three-sided frame or on a periphery of the three-sided frame making correspondence with a relative position of the car from a position of the car responding to the call to a calling floor and an arrival direction of the car when the car responding to the call moves, and emphasizing to display the first light on the three-sided frame or on the periphery of the three-sided frame when the car responding to the call arrives at the calling floor and a door in a lobby of the car responding to the call opens, and displaying a second light on the three-sided frame or on the periphery of the three-sided frame when the door fully opens, using operation information of the car responding to the call of an elevator and open/close information of the door of the elevator which are input from a car moving device controlling the car of the elevator; and display means for outputting the guidance information to a display device displaying the guidance information.

A guiding device according to still another aspect of the present invention comprises: control means for generating guidance information for displaying a first light on a three-sided frame or on a periphery of the three-sided frame when a car responding to a call is selected, displaying a second light on the three-sided frame or on the periphery of the three-sided frame making correspondence with a relative position of the car from a position of the car responding to the call to a calling floor when the car moves, emphasizing to display the second light on the three-sided frame or on the periphery of the three-sided frame when the car responding to the call arrives at the calling floor and a door of a lobby of the car responding to the call opens, displaying a third light on the three-sided frame or the periphery of the three-sided frame when the door fully opens, and emphasizing to display a fourth light on the three-sided frame or on the periphery of the three-sided frame when the door closes, using operation information of the car responding to the call of an elevator and open/close information of the door of the elevator which are input from a car moving device controlling the car of the elevator; and display means for outputting the guidance information to a display device displaying the guidance information.

Advantageous Effects of Invention

A guiding device according to the present invention generates and displays guidance information for displaying a sequence of operation of an elevator on a three-sided frame corresponding to a car responding to a call for the elevator or the periphery of the three-sided frame, by using operation information about the car responding to the call and opening/closing information about the door of the elevator. Thus, a user in the elevator lobby can be intuitively notified of the complicated sequence of operation of the elevator.

BRIEF DESCRIPTION OF DRAWINGS

FIG. 7 is an example of display by a guiding device 1 according to a third embodiment of the present invention.

FIG. 9 is an example of display by a guiding device 1 according to a fourth embodiment of the present invention.

DESCRIPTION OF EMBODIMENTS

The following is a detailed description of embodiments of guiding devices according to the present invention, which makes a reference to the drawings. Note that the present invention is not limited by these embodiments.

First Embodiment

Figure 1:
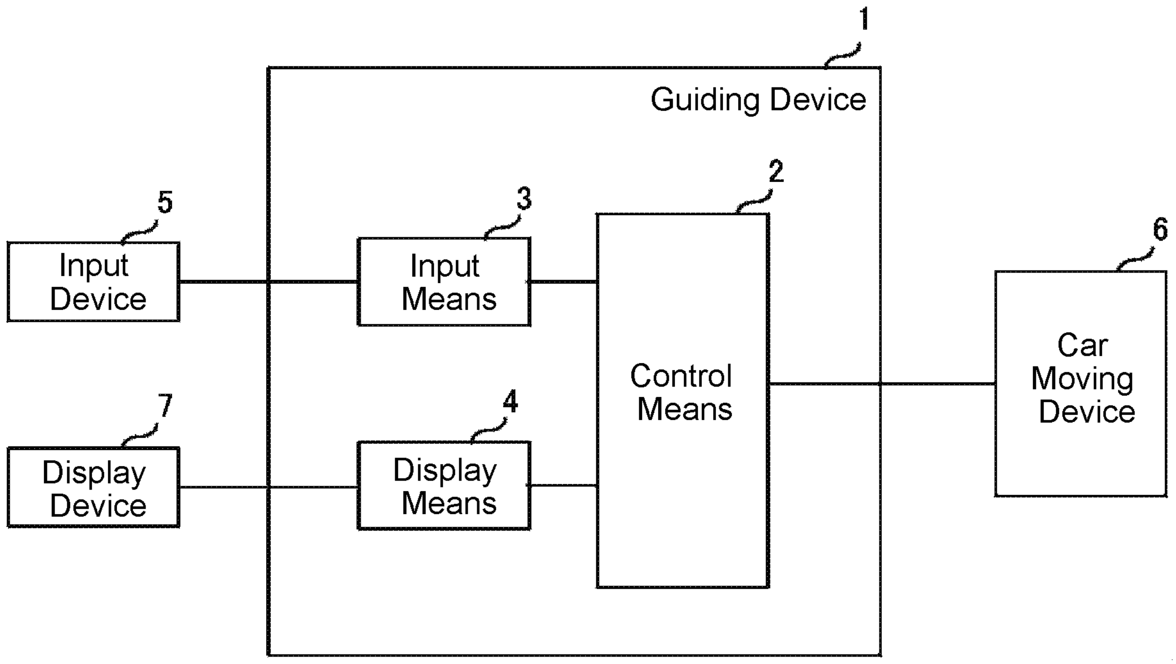
FIG. 1 is a functional configuration diagram of a guiding device 1 according to a first embodiment of the present invention.

FIG. 1 is a functional configuration diagram of a guiding device 1 according to a first embodiment of the present invention.

The guiding device 1 includes a control means 2, an input means 3, and a display means 4.

The guiding device 1 receives an input of information about a call for an elevator or the like from an input device 5, and an input of information about the elevator car to be moved in response to the call and information about opening/closing of the doors in the elevator lobby of the calling floor from a car moving device 6 that controls the elevator depending on the information about the call. Guidance information indicating the sequence of operation of the elevator car and the doors responding to the call is then generated, and this guidance information is displayed on the three-sided frame and the doors in the elevator lobby by a display device 7 installed in the lobby of the calling floor.

Note that the sequence of operation of the elevator car and the doors responding to the call includes the position and the arrival direction of the elevator car from the time the elevator car responding to the call is determined until the elevator car arrives at the calling floor, and the situations from the arrival of the car till the opening and closing of the doors.

The input device 5 is a device capable of inputting information about a call to the elevator, such as a lobby button provided in the elevator lobby, a destination button provided in the elevator car, a board registering device included in an entry/exit managing system for a building or the like, or a smartphone and/or a wearable terminal being carried by the user of the elevator. A camera provided in the elevator car, a sensor that measures the situation in the elevator car, and a device into which information for identifying the user of the elevator, including an identification (ID) tag of the user using the elevator, is input are also included.

When information about a call for an elevator is input, the car moving device 6 determines the elevator car to respond to the call, and moves the elevator car to the calling floor. Further, when the elevator car arrives at the calling floor, the doors in the lobby of the calling floor are opened and closed. The car moving device 6 also outputs, to the guiding device 1, the car number of the car responding to such a call, car operation information, and door opening/closing information. Further, in a case where the car moving device 6 has already acquired information about the camera installed in the elevator car, information about the sensor that measures a situation in the elevator car, and information about the user of the elevator, the camera information, the sensor information, and the elevator user information may be output from the car moving device 6 to the guiding device 1.

The display device 7 is a projector installed in the elevator lobby, and is a device that projects guidance information onto a three-sided frame, the wall above the three-sided frame, the doors, and the floor in front of the doors. Alternatively, the display device 7 may be a display that is embedded in the entire surface of the three-sided frame in the lobby, the wall above the three-sided frame, the entire surfaces of the doors, and the floor in front of the doors, or may be a light emitting diode (LED) or lighting equipment, as long as it is a device capable of displaying guidance information on the three-sided frame, the wall above the three-sided frame, the doors, and the floor in front of the doors.

Next, each of the components of the guiding device 1 is described.

The control means 2 receives an input of information about a call for an elevator from the input device 5 via the input means 3, and receives an input of the car number and the position of the car responding to the call and door opening/closing information from the car moving device 6. The distance between the position of the car at the time of the call and the calling floor is calculated, and the relative position of the car responding to the call and the arrival direction of the car are determined. Guidance information for continuously displaying the sequence of operation of the elevator including the state of the car responding to the call and the opening/closing state of the doors in the lobby on the three-sided frame and the doors in the lobby with light is then generated with the use of the position of the car with respect to the distance between the car responding to the call and the calling floor, the arrival direction of the car responding to the call, and the door opening/closing information. The generated guidance information is displayed on the three-sided frame and the doors in the lobby with the display device 7 via the display means 4. The guidance information also includes display of the arrival direction of the car on the wall above the three-sided frame and display of the position of the lobby of the car responding to the call in the region of the floor in front of the doors.

The three-sided frame is installed in the opening portion of the entrance of the elevator, and is formed in a gate-like shape with a pair of upright frames covering both side portions of the opening portion and an upper frame that is disposed between the upper end portions of these upright frames and covers the upper portion of the opening portion.

Further, the lights described below differ from one another in brightness, saturation, or hue.

The input means 3 is an input interface between the guiding device 1 and the input device 5, and the display means 4 is an output interface between the guiding device 1 and the display device 7.

Next, the hardware configuration of the guiding device 1 is described.

Figure 2:
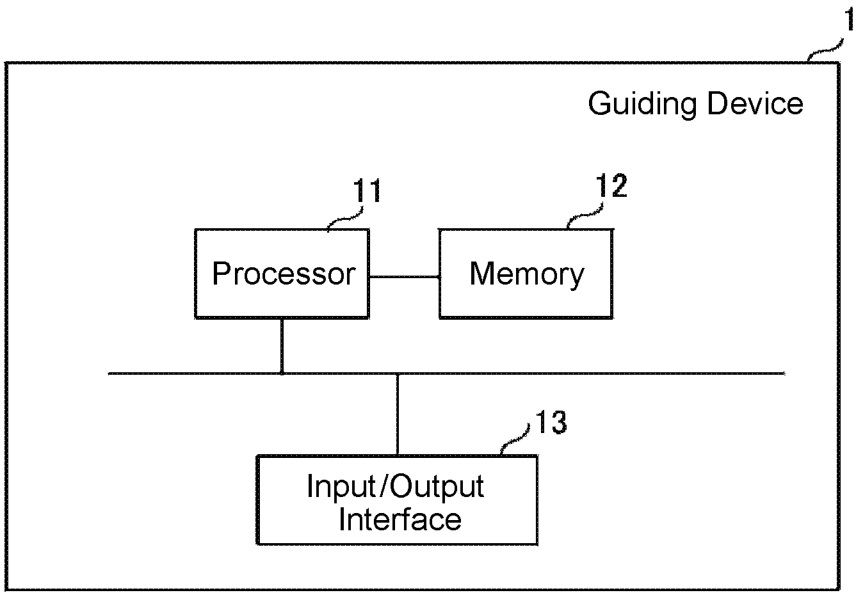
FIG. 2 is a hardware configuration diagram of the guiding device 1 according to the first embodiment of the present invention.

FIG. 2 is a hardware configuration diagram of the guiding device 1 according to the first embodiment of the present invention.

The guiding device 1 includes a processor 11, a memory 12, and an input/output interface 13. The control means 2 of the guiding device 1 shown in FIG. 1 is formed by the processor 11 reading and executing a program stored in the memory 12. The input means 3 and the display means 4 are input/output interfaces.

Next, operation of the guiding device 1 is described.

First, an example of display of guidance information to be displayed at an elevator lobby by the guiding device 1 is described.

Figures 1, 3:
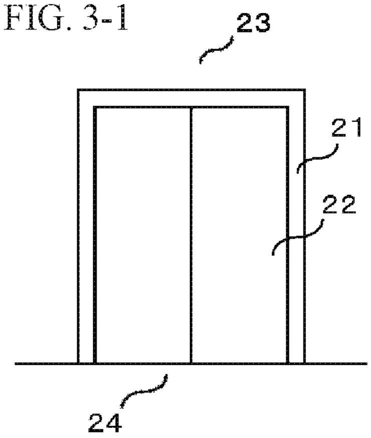
FIG. 3 is an example of display by the guiding device 1 according to the first embodiment of the present invention.

FIG. 3 is an example of display by the guiding device 1 according to the first embodiment of the present invention.

FIG. 3-1 shows the state of the lobby when there is no call. In the lobby, there are a three-sided frame 21, doors 22, a wall 23 above the three-sided frame, and a floor 24 in front of the doors 22 in the lobby.

When information about a call is input to the input device 5 by a user of the elevator, the information about the call is transmitted from the input device 5 to the guiding device 1 and the car moving device 6. The car moving device 6 then selects the car responding to the call.

Figures 2A, 3:
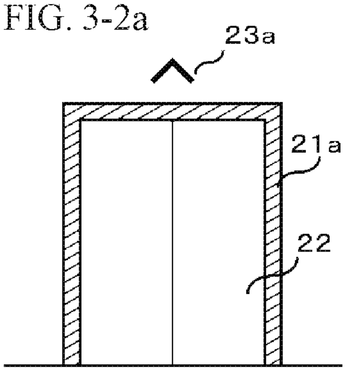

As shown in FIG. 3-2A, a first light is displayed as guidance information about the selected car responding to the call on the entire surface of a three-sided frame 21*a* in the lobby of the calling floor. The arrival direction of the car is also displayed on a wall 23*a* above the three-sided frame 21. The information about the arrival direction of the car displayed on the wall 23*a* may be displayed with the first light or may be displayed with another light.

Figures 2B, 3:
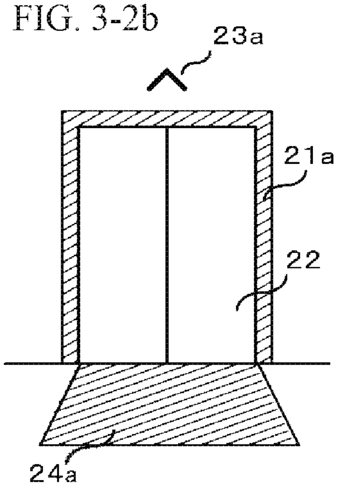

Alternatively, as shown in FIG. 3-2B, the first light may also be displayed as guidance information in the region of a floor 24*a* in front of the doors 22 corresponding to the three-sided frame 21*a*, like the first light displayed on the three-sided frame 21*a*. By displaying the guidance information on the floor 24 in front of the doors 22 in this manner, it is possible to show intuitively a user who has moved from a distant place where is the entrance to the car responding to the call.

Figures 3, 3A:
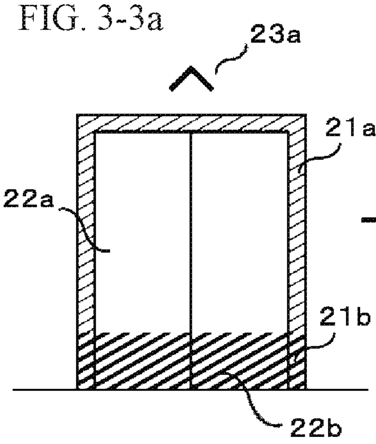

When the car starts moving, a second light is displayed as the guidance information on a partial region 21*b* of the three-sided frame 21 and a partial region 22*b* of the doors 22, depending on the position and the arrival direction of the car, as shown in FIG. 3-3A. In a case where the car responding to the call comes from below the lobby at this point of time, the second light is displayed gradually from the bottom toward the top of the doors 22. In the other region 21*a* of the three-sided frame 21 and the other region 22*a* of the doors 22, the first light is displayed. That is, the region corresponding to the distance the car has moved since the car responded to the call is indicated by the second light, and the distance from the current position to the calling floor is indicated by the first light.

In this example, after the car starts moving, the position and the arrival direction of the car are displayed with the second light on the doors 22 as well as on the three-sided frame 21. However, the position and the arrival direction of the car should be displayed with the second light at least on the three-sided frame 21. Further, in the example described in the first embodiment, the sequence of operation of the elevator is displayed with a continuous light on the three-sided frame 21 and the doors 22. However, the sequence of operation of the elevator may be displayed with a continuous light on the three-sided frame 21 or the periphery of the three-sided frame 21. The periphery of the three-sided frame 21 refers to one or a combination of either or both of the outer side and the inner side of the three-sided frame 21, the floor (around the floor 24 in front of the doors 22) in the vicinity of the three-sided frame 21, the doors 22 inside the three-sided frame 21, and the wall 23 surrounding the three-sided frame 21. In a case where the car responding to the call comes from above the lobby, on the other hand, the second light is displayed gradually from the tops of the three-sided frame 21 and the doors 22.

Figures 3, 3B:
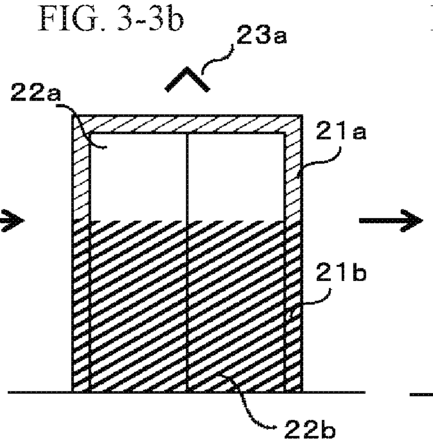
Figures 3, 3C:
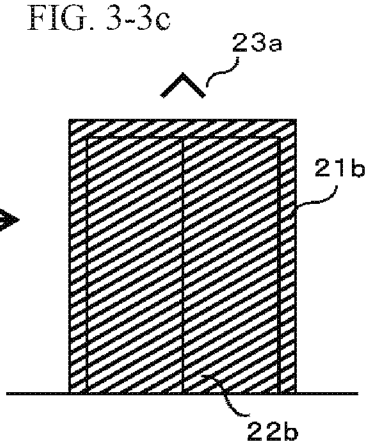

Further, when the position of the car approaches the calling floor, as shown in FIG. 3-3B, the region of the second light displayed on the three-sided frame 21 and the doors 22 becomes wider than in FIG. 3-3A. When the car arrives at the lobby, the entire surface of the three-sided frame 21 and the entire surfaces of the doors 22 are indicated with the second light, as shown in FIG. 3-3C. In this manner, the position and the arrival direction of the moving car with respect to the distance between the position at the time the car responded to the call and the calling floor are displayed with the second light on the region 21*b* of the three-sided frame 21 and the region 22*b* of the doors 22. When the car arrives at the calling floor, the region 21*b* of the three-sided frame 21 and the region 22*b* of the doors 22, which is connected with the position and the arrival direction of the car, are indicated with the second light, so that the second light is displayed on the entire surface of the three-sided frame 21 and the entire surfaces of the doors 22.

After that, immediately before the doors 22 start opening after the car arrives at the lobby and while the doors are opening (when the doors 22 open), the second light blinks to be displayed in an emphasized manner. Further, the arrival direction of the car displayed on the wall 23 disappears. The blinking of the second light can be indicated by a blinking moving image generated by combining a state in which the second light is displayed on the entire surface of a three-sided frame 21*c* and the entire surfaces of doors 22*c* as shown in FIG. 3-4A, and a state in which the second light is off as shown in FIG. 3-4B, for example.

The second light displayed on the three-sided frame 21 and the doors 22 is made to blink in this manner, so that the user of the lobby can be intuitively notified that the doors are about to open.

The term "moving image" as used herein also includes animation, and also includes making it look like a moving picture by adjusting the brightness of lights and the lighting equipment. For example, it is possible to adjust the brightness of the lighting equipment displaying the second light by adjusting the brightness of the lighting equipment installed on the three-sided frame 21, so that the second light can be made to appear as if repeatedly expanding and contracting, instead of blinking on the three-sided frame 21. Alternatively, it is possible to emphasize the three-sided frame 21 by projecting the second light on the three-sided frame 21 with a projector so as to expand or contract to the regions of the doors 22, the wall 23, and the floor 24 around the three-sided frame 21. The second light is displayed in a blinking and emphasized manner on the three-sided frame 21, the three-sided frame 21 is displayed in an emphasized manner by adjusting the brightness of the lighting equipment installed on the three-sided frame 21, or the three-sided frame 21 is displayed in an emphasized manner on the region around the three-sided frame 21 by expanding or contracting the second light, so that the user of the lobby can be prompted to pay attention when the doors start opening or while the doors are opening.

Figures 3, 4, 4A:
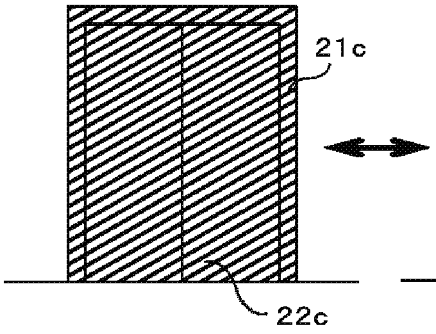
FIG. 4 is a flowchart showing an operation of the guiding device 1 according to the first embodiment of the present invention.
Figures 3, 4, 4B:
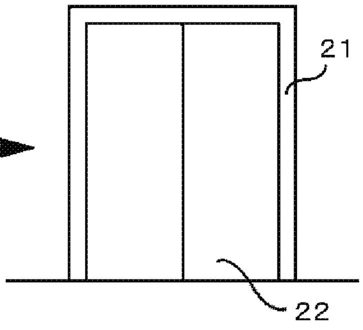
Figures 3, 4, 5:
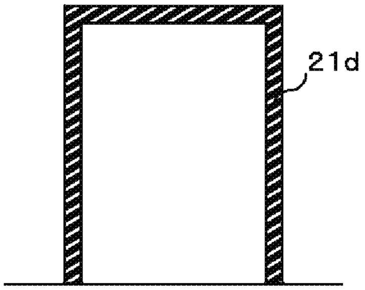
FIG. 5 is an example of display by a guiding device 1 according to a second embodiment of the present invention.

When the doors 22 are fully open, a third light is displayed on the entire surface 21*d* of the three-sided frame 21, as shown in FIG. 3-5. After that, immediately before the doors 22 start closing and while the doors 22 are closing (when the doors 22 close), a fourth light is displayed in a blinking manner on the entire surface of a three-sided frame 21*e*. The blinking of the fourth light can be indicated by a blinking moving image generated by combining a state in which the fourth light is displayed on the entire surface 21*e* of the three-sided frame 21 as shown in FIG. 3-6A, and a state in which the fourth light is off as shown in FIG. 3-6B, for example.

As the third light is displayed on the three-sided frame 21 and the doors 22 as described above, it is possible to intuitively show the user who is about to get in the car at the lobby that the doors 22 are fully open and then start closing. Further, as the fourth light is displayed on the three-sided frame 21 and the doors 22 in a blinking manner, it is possible to intuitively show the user of the situation where the doors 22 are closed.

Note that, instead of displaying the fourth light in a blinking manner, the three-sided frame 21 may be emphasized by adjusting the brightness of the lighting equipment displaying the fourth light or the three-sided frame 21 may be emphasized by expanding or contracting the projected fourth light to the regions of the wall 23 and the floor 24 around the three-sided frame 21.

As shown in FIGS. 3-1 through 3-6, the sequence of operation of the elevator, including the position of the lobby of the car responding to the call, the state of the car responding to the call, and the opening/closing state of the doors in the lobby, is continuously displayed with light on the three-sided frame or the periphery of the three-sided frame in the lobby. With such display, it is possible to intuitively show the user in the lobby of the sequence of complicated movement of the elevator. As described above, the periphery of the three-sided frame refers to one or a combination of either or both of the outer side and the inner side of the three-sided frame, the floor (around the floor in front of the doors) in the vicinity of the three-sided frame, the wall around the three-sided frame, and the doors inside the three-sided frame.

The above is the description of an example of display by the guiding device 1 according to the first embodiment.

Note that, although the relative position and the arrival direction of the car are displayed on the three-sided frame 21 or the periphery of the three-sided frame 21 in this embodiment, the car waiting time calculated from the time required from the time the car responds to a call until the car arrives at the calling floor and the position of the car, and the arrival direction of the car may be displayed on the three-sided frame 21 or the periphery of the three-sided frame 21.

Next, operation of the guiding device 1 is described, with reference to a flowchart.

FIG. 4 is a flowchart showing the operation of the guiding device 1 according to the first embodiment of the present invention.

First, when information about a call is input from the input device 5 by a user of the elevator, the information about the call is input from the input device 5 to the input means 3 of the guiding device 1 (step (hereinafter written as S) 1). At the same time, the information about the call is also input from the input device 5 to the car moving device 6.

The car moving device 6 then selects the car responding to the call depending on the information about the call, and information about the car, including the car number and the position of the car responding to the call, is input from the car moving device 6 to the control means 2 of the guiding device 1 (S2).

The control means 2 then generates guidance information for displaying the first light on the entire surface 21*a* of the three-sided frame 21 in the lobby corresponding to the car number of the car responding to the call, and displaying the information indicating the arrival direction of the car on the wall 23*a* above three-sided frame 21 (S3). From the calling floor and the position of the car responding to the call, the control means 2 determines the arrival direction of the car with respect to the calling floor. For example, in a case where the calling floor is the third floor, and the position of the car responding to the call is on the first floor, information indicating an upward direction is displayed as the arrival direction of the car responding to a call from the third floor. Therefore, the guidance information generated by the control means 2 includes information for displaying the first light on the entire surface 21*a* of the three-sided frame 21 in the lobby of the car responding to the call, and information for displaying the arrival direction of the car responding to the call on the wall 23*a*. The control means 2 then displays the generated guidance information on the three-sided frame 21*a* and the wall 23*a* with the display device 7 via the display means 4 (FIG. 3-2A).

Alternatively, the control means 2 may display the first light on the entire surface 21*a* of the three-sided frame 21 of the lobby corresponding to the car number of the car responding to the call and on the floor 24*a* in front of the doors 22 corresponding to the three-sided frame 21 (FIG. 3-2B).

Information about movement of the car responding to the call is then input as the position of the car from the car moving device 6 to the control means 2. In response to that, the control means 2 calculates the relative position of the car with respect to the distance between the position of the car at the time the car responded to the call and the calling floor. The control means 2 then generates guidance information for displaying the second light on the three-sided frame 21 and the doors 22 in the lobby of the calling floor, the second light indicating the position of the car with respect to the distance between the position of the car at the time the car responded to the call and the calling floor. Guidance information indicating the arrival direction of the car on the wall 23*a* is also included. The control means 2 then displays the generated guidance information on the three-sided frame 21, the doors 22, and the wall 23 in the lobby of the calling floor with the display device 7 via the display means 4 (S4) (FIGS. 3-3A and 3-3B).

Note that the position of the calling floor may be calculated from the information about the call by the control means 2, and the information about the call may be input, together with the information about the car responding to the call, from the car moving device 6 to the control means 2.

Since the partial region indicated by the second light in the three-sided frame 21 also includes information about the arrival direction of the car, when the car comes from below the calling floor, the guidance information is displayed with the second light gradually from the lower region of the three-sided frame 21. When the car comes from above the calling floor, the guidance information is displayed with the second light gradually from the upper region of the three-sided frame 21.

As described above, the guidance information is information for displaying the partial region 21*b* of the three-sided frame 21 and the partial region 22*b* of the doors with the second light indicating the relative position of the car with respect to the distance between the position of the car at the time the car responded to the call and the calling floor, and the arrival direction of the car. The other region 21*a* of the three-sided frame 21 and the other region 22*a* of the doors 22 are guidance information for displaying the distance from the current position of the car to the calling floor with the first light.

Information about the arrival of the car at the calling floor is then input from the car moving device 6 to the control means 2. The control means 2 then generates guidance information for displaying the entire surface 21*b* of the three-sided frame 21 and the entire surfaces 22*b* of the doors 22 with the second light. The generated guidance information is then displayed on the three-sided frame 21*b* and the doors 22*b* in the lobby of the calling floor by the display device 7 via the display means 4 (S5) (FIG. 3-3C).

Information indicating that the doors are open is then input from the car moving device 6 to the control means 2 immediately before (a preset time before) the doors open after the car arrives at the lobby. In response to that, the control means 2 generates guidance information for causing the second light to blink to emphasize the second light displayed on the three-sided frame 21 and the doors 22 (or emphasizing the second light with a blinking moving image), and hiding the display of the arrival direction of the car on the wall 23 (S6). The control means 2 then causes the second light to blink on the three-sided frame 21 and the doors 22 with the display device 7 via the display means 4, and hides the display of the arrival direction of the car on the wall 23 (FIGS. 3-4A and 3-4B).

Note that, instead of displaying the second light in a blinking manner on the three-sided frame 21, the control means 2 may emphasize the three-sided frame 21 by adjusting the brightness of the lighting equipment displaying the second light. Alternatively, it is possible to emphasize the three-sided frame 21 by displaying the second light so as to expand or contract to the regions of the doors 22, the wall 23, and the floor 24 around the three-sided frame 21.

Information indicating that the doors 22 are fully open is then input from the car moving device 6 to the control means 2. The control means 2 then generates guidance information for displaying the third light on the entire surface 21*d* of the three-sided frame 21, and displays the guidance information on the three-sided frame 21 with the display device 7 via the display means 4 (S7) (FIG. 3-5).

Information for closing the doors 22 is then input from the car moving device 6 to the control means 2 immediately before (a preset time before) the doors 22 close. In response to that, the control means 2 generates guidance information for displaying the fourth light in a blinking manner on the entire surface 21*e* of the three-sided frame 21. The control means 2 then displays the fourth light in a blinking manner on the entire surface 21*e* of the three-sided frame 21 with the display device 7 via the display means 4 (S8) (FIGS. 3-6A and 3-6B). Information indicating that the doors 22 are closed is then input from the car moving device 6 to the control means 2. In response to that, the control means 2 hides the display of the fourth light.

Note that, instead of displaying the fourth light in a blinking manner, the control means 2 may emphasize the fourth light on the three-sided frame 21 by adjusting the brightness of the lighting equipment displaying the fourth light. Alternatively, it is possible to emphasize the three-sided frame 21 by displaying the fourth light so as to expand or contract to the regions of the wall 23 and the floor 24 around the three-sided frame 21.

The above respective processes performed by the guiding device 1 correspond to a guiding method, the process performed by the control means 2 corresponds to a control step, and the process of outputting guidance information from the control means 2 to the display device 7 via the display means 4 and displaying the guidance information corresponds to a display step.

Note that the guidance information generated by the control means 2 is supposed to indicate the sequence of operation of the elevator by continuously displaying the sequence with light as shown in FIGS. 3-1 through 3-6, but the respective states may be displayed intermittently or fragmentarily with light.

As described above, the sequence of operation of the elevator, including the position of the lobby corresponding to the car number of the car responding to a call, the movement of the car responding to the call, the arrival direction of the car, the opening and closing of the doors, is displayed as guidance information on the three-sided frame and the doors in the lobby, so that the user can intuitively determine the state of the car responding to the call and the state of opening and closing of the doors.

Note that, although the sequence of operation of the elevator is displayed on the three-sided frame and the doors in the first embodiment, the sequence of operation of the elevator may be displayed only on the three-sided frame. As shown in FIGS. 3-1 through 3-6, it is also possible to display with light, including the three-sided frame and either or both of the outer side and the inner side of the three-sided frame. Alternatively, light as the guidance for the sequence of operation of the elevator may be displayed not on the three-sided frame but only on the floor around the three-sided frame serving as the entrance (around the floor in front of the doors inside the three-sided frame). Further, the light as the guidance for the sequence of operation of the elevator may be continuously displayed only on the wall around the three-sided frame, or the light as the guidance for the sequence of operation of the elevator may be displayed only on the doors inside the three-sided frame. It is also possible to continuously, intermittently, or fragmentarily display the sequence of operation of the elevator with light on any combination of the three-sided frame, the floor, the wall surrounding the three-sided frame, and the doors. In the above described first embodiment, the relative position of the car responding to a call and the sequence of opening and closing of the doors are displayed as guidance information at least on the three-sided frame. However, regarding the movement of the car responding to the call, the car waiting time calculated from the time required from the response to the call till the arrival at the calling floor and the position of the call, and the arrival direction of the car may be displayed at least on the three-sided frame.

Further, in the above described first embodiment, the guidance information includes indicating the arrival direction of the car on the wall above the three-sided frame. However, the arrival direction of the car may be indicated on the wall around the three-sided frame.

Alternatively, content corresponding to the guidance information may be output as voice from a speaker (not shown), to guide the user with the voice.

Second Embodiment

In the above described first embodiment, in response to a call from a user of the elevator, guidance information is displayed to continuously indicate, with light, the sequence of operation of the elevator, including the position of the lobby of the car responding to the call, the relative distance or time to the car responding to the call, the opening and closing of the doors, on the three-sided frame or the periphery of the three-sided frame. A second embodiment further concerns an example of guidance to be given by the doors and the floor in the lobby indicating that there is a user on a wheelchair in the elevator, in a case where it is known that the user is a person on a wheelchair from information about the user in the elevator car responding to the call.

The functional configuration diagram and the hardware configuration diagram of the guiding device 1 are the same as those of the first embodiment.

FIG. 5 is an example of display by the guiding device 1 according to the second embodiment of the present invention.

FIG. 5-1 shows the state of the lobby when there is no call. As in FIG. 3-1, in the lobby, there are the three-sided frame 21, the doors 22, the wall 23 above the three-sided frame, and the floor 24 in front of the doors in the lobby.

When information about a call is input to the input device 5 by a user of the elevator, the information about the call is transmitted from the input device 5 to the guiding device 1 and the car moving device 6. The car moving device 6 then selects the car responding to the call. As a result, the first light is displayed as guidance information about the selected car responding to the call on the entire surface of the three-sided frame 21*a* or the entire surface of the three-sided frame 21*b* in the lobby of the calling floor, as shown in FIG. 5-2A or 5-2B.

Further, in a case where the guiding device 1 can determine from a sensor or user registration that the user (passenger) in the car is on a wheelchair, and the guiding device 1 can determine from user information in the user registration that the user on a wheelchair is going to get off the car on the calling floor, a wheelchair symbol and the text "getting off" are displayed as guidance information at the center of the doors 22 as shown in FIG. 5-2A. The arrival direction of the car is also displayed on the wall 23*a* above the three-sided frame 21*a*. Note that the display on the doors 22 may be with the same first light as with the three-sided frame 21 or with some other light.

On the other hand, in a case where there is a user on a wheelchair in the car, and the guiding device 1 can determine that the user on a wheelchair will not get off at the calling floor, a wheelchair symbol is displayed as guidance information at an upper right portion of the doors 22 as shown in FIG. 5-2B. The arrival direction of the car is also displayed on the wall 23*a* above the three-sided frame 21*a*. Note that information about the user may be displayed with the same light as the light on the three-sided frame 21, or may be displayed with some other light.

When the car starts moving, as described in the first embodiment, the second light is displayed on the three-sided frame in conjunction with the relative position and the arrival direction of the car as shown in FIG. 5-3A. At the same time, the second light is displayed on the three-sided frame, with the guidance information about the user on a wheelchair shown in FIG. 5-2A or FIG. 5-2B being displayed on the doors 22.

Further, when the position of the car approaches the calling floor and the passenger on a wheelchair is about to get off on the calling floor, guidance information is displayed in the form of a moving image in which a wheelchair symbol moves to the floor 24, to indicate that the car with the user on a wheelchair is approaching as shown in FIG. 5-3B. With this display, the user of the lobby can intuitively recognize that the passenger on a wheelchair is about to get off on the calling floor.

Further, in a case where the passenger on a wheelchair is about to get off on the calling floor, an image showing a passenger on a wheelchair getting off the elevator car, and the region required for the passenger on a wheelchair to get off the elevator car are displayed with the second light on the floor 24*a* in front of the doors 22, immediately before the doors 22 open after the car arrives at the calling floor. For example, as shown in FIG. 5-3C, the region of the floor 24*a* required for a wheelchair to get off the car is displayed as guidance information with the second light, in conjunction with a moving image in which the wheelchair symbol moves from the doors 22 to the floor 24*a* in front of the doors 22.

Figures 1, 5:
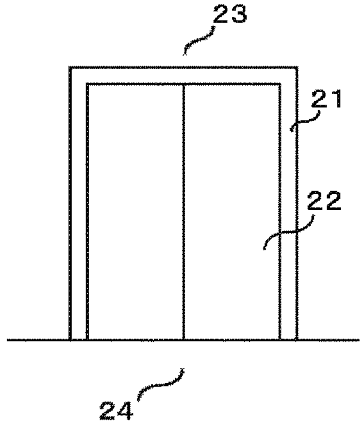
Figures 2A, 5:
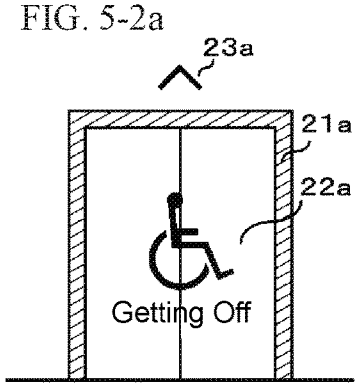
Figures 2B, 5:
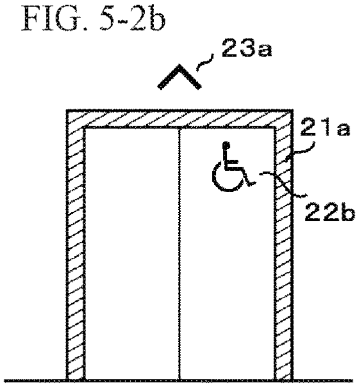
Figures 3A, 5:
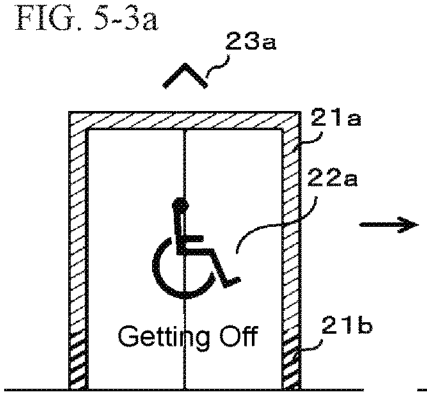
Figures 3B, 5:
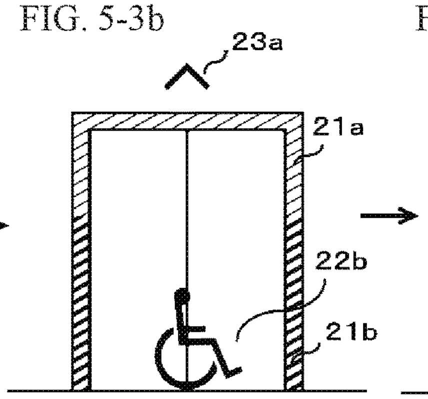
Figures 3C, 5:
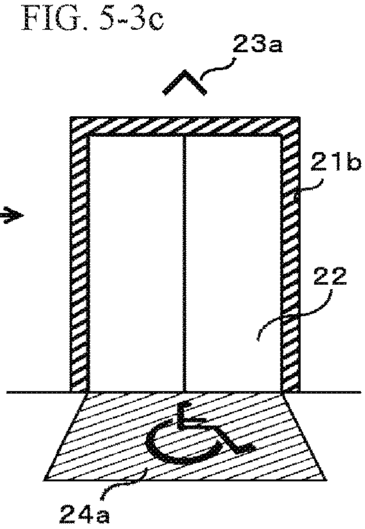
Figures 3D, 5:
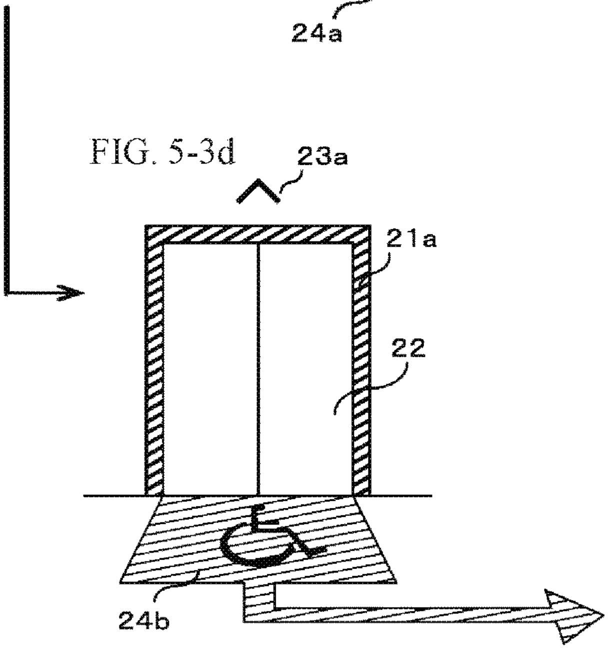
Figure 6:
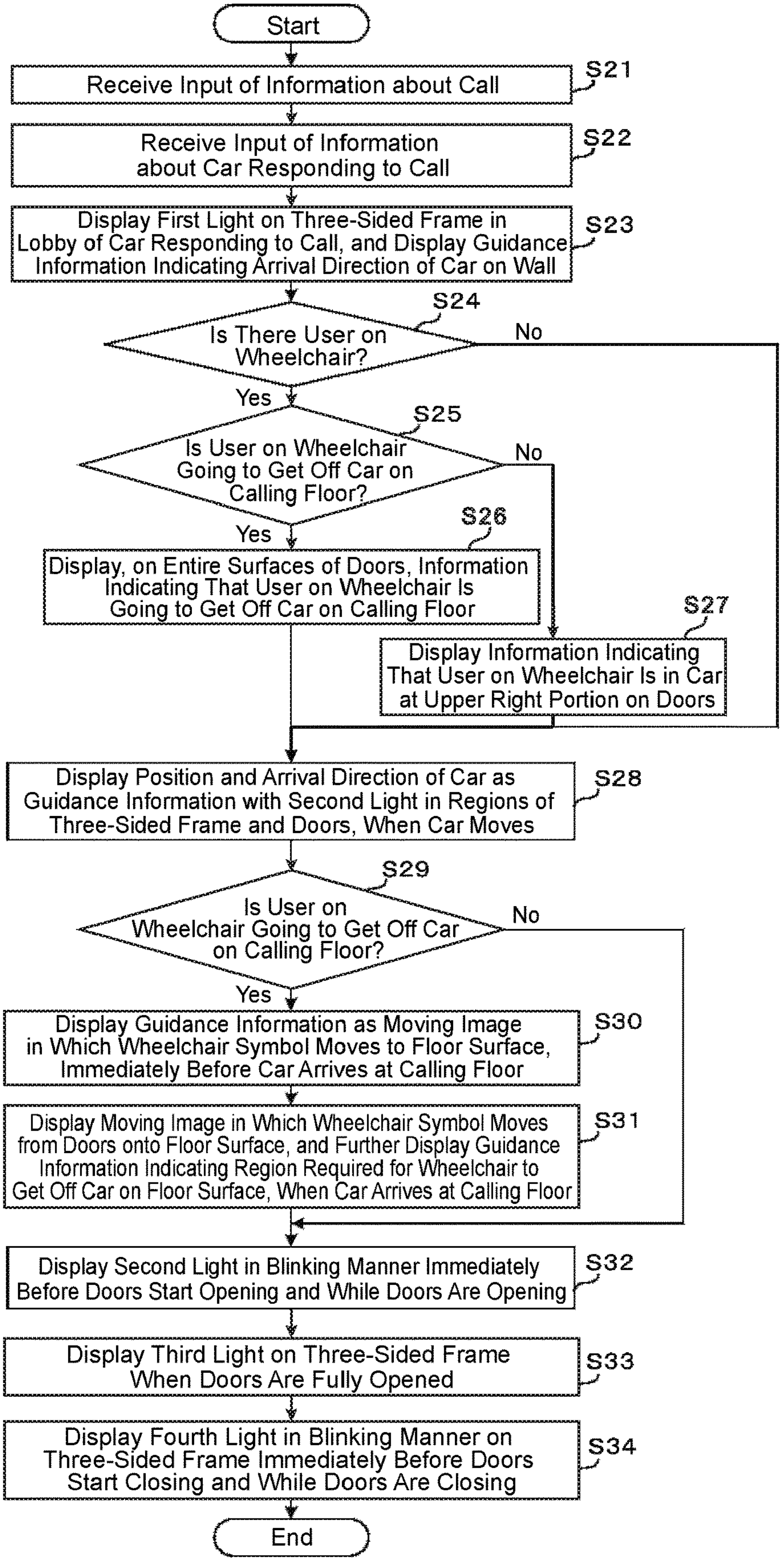

Further, as shown in FIG. 5-3D, in a case where the direction in which the passenger on a wheelchair is going to move after getting off on the lobby is included in the information about the user and has been input to the guiding device 1, the moving direction may be displayed as well as the region required for the passenger to get off the car.

The display of the guidance information during the time from immediately before the doors 22 open until the doors 22 fully open and then close is the same as in FIGS. 3-4, 3-5, and 3-6. Further, the direction in which the user on a wheelchair moves may be displayed on the floor 24 during the time since the doors 22 fully open until the doors 22 close and during a preset time after the doors 22 close.

Information about the destination of the user on a wheelchair is displayed as information about the user of the elevator in the lobby until the doors 22 open, and, after the doors 22 open, the information is about the destination of the user on a wheelchair. The user in the lobby can be intuitively notified beforehand that a user on a wheelchair is going to get off the elevator car, and of the region required in front of the doors after the user on a wheelchair gets off the car. The user on a wheelchair, who has got off the elevator, can move in the intended direction without getting lost, using the destination information as the guide.

The above is the description of an example of display by the guiding device 1 according to the second embodiment.

Next, operation of the guiding device 1 is described, with reference to a flowchart.

Figures 3, 4, 5, 6, 6A:
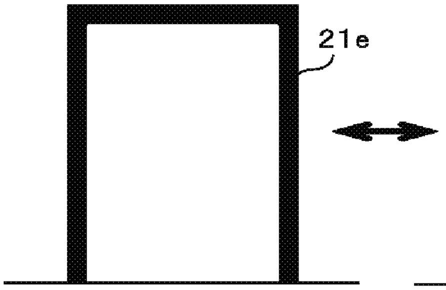
FIG. 6 is a flowchart showing an operation of the guiding device 1 according to the second embodiment of the present invention.
Figures 3, 4, 5, 6, 6B:
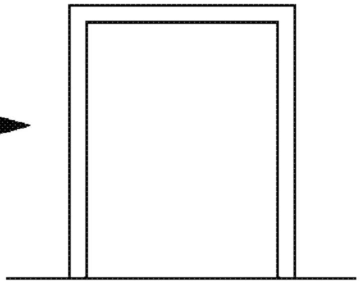
Figure 4:
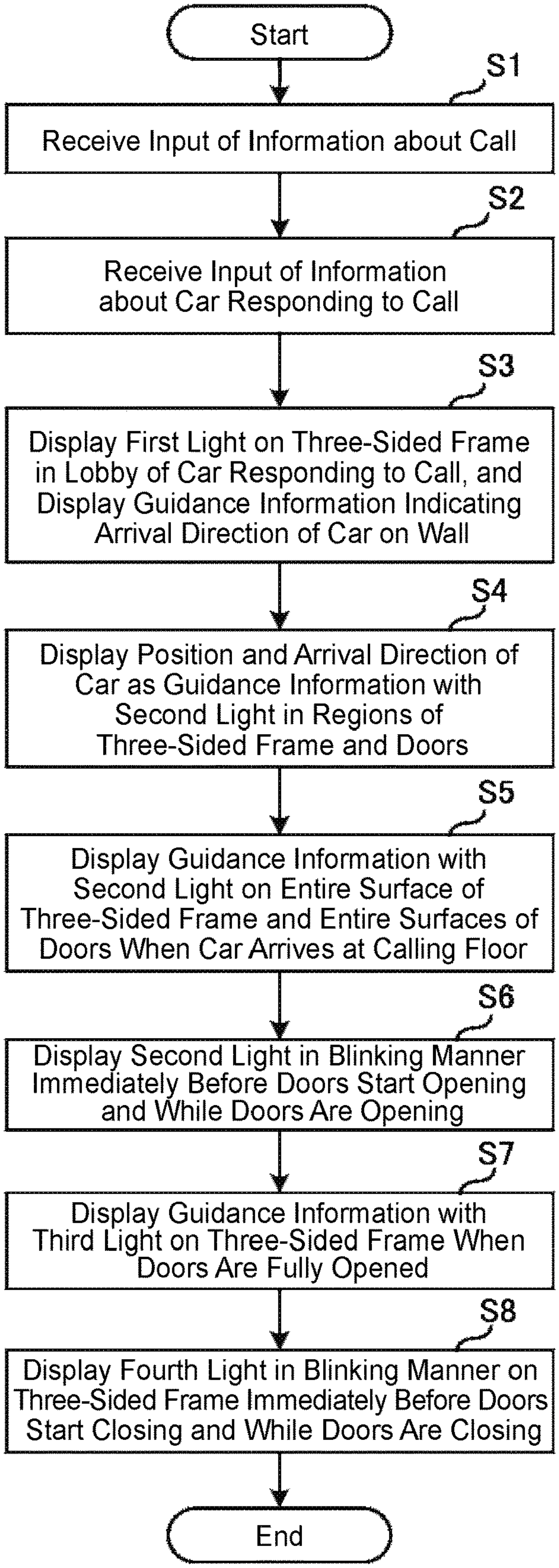

FIG. 6 is a flowchart showing the operation of the guiding device 1 according to the second embodiment of the present invention.

First, when information about a call is input from the input device 5 by a user of the elevator, the information about the call is input from the input device 5 to the input means 3 of the guiding device 1 as in the first embodiment (S21). At the same time, the information about the call is also input from the input device 5 to the car moving device 6.

The car moving device 6 then selects the car responding to the call depending on the information about the call, and information including the car number and the position of the car responding to the call is input from the car moving device 6 to the control means 2 of the guiding device 1 (S22).

The control means 2 then generates guidance information for displaying the first light on the entire surface 21*a* of the three-sided frame 21 in the lobby corresponding to the car number of the car responding to the call, and indicating the arrival direction of the car on the wall 23*a*. The control means 2 then displays the generated guidance information on the three-sided frame 21*a* and the wall 23*a* with the display device 7 via the display means 4 (S23).

Further, the control means 2 has received an input of information about the user in the car together with the information about the call from the input device 5 via the input means 3, and, from the information, determines whether the user is a user on a wheelchair (S24). Note that the information about the user may be input from the car moving device 6 to the control means 2.

If the user is a user of the wheelchair, it is determined whether the user of the wheelchair gets off at the calling floor from the user's information (S25).

If the passenger is a user on a wheelchair and is going to get off on the calling floor, the control means 2 generates guidance information including display of a wheelchair symbol and the text "getting off" at the center of the entire surface 22*a* of the doors 22. This guidance information may differ from the information shown in FIG. 5-2A, as long as the contents thereof indicate that a user on a wheelchair is going to get off on the calling floor. The control means 2 then displays the guidance information on the entire surface 22*a* of the doors 22 with the display device 7 via the display means 4 (S26) (FIG. 5-2A).

If the passenger is a user on a wheelchair and is not going to get off on the calling floor (a situation where the user remains in the car on the calling floor), guidance information including display of a wheelchair symbol at the upper right portion 22*b* of the doors 22 is generated. This guidance information may differ from the information shown in FIG. 5-2B, as long as the contents thereof indicate that the user on a wheelchair remains in the car. The control means 2 then displays the guidance information at the upper right portion 22*b* of the doors 22 with the display device 7 via the display means 4 (S27) (FIG. 5-2B).

Further, if the information about the user does not indicate any user on a wheelchair, the same operation as the operation in S3 in the first embodiment is performed, and the display shown in FIGS. 3-2A and 3-2B is performed.

Information about movement of the car is then input from the car moving device 6 to the control means 2. In response to that, the control means 2 calculates the position of the car with respect to the distance between the position of the car at the time the car responded to the call and the calling floor, using the car position input from the car moving device 6. The control means 2 then displays the second light in the partial region 21*b* on the three-sided frame 21 in the lobby, depending on the position of the car with respect to the distance between the position of the car at the time the car responded to the call and the calling floor, and the arrival direction of the car. The control means 2 displays the second light in a part of the region 21*b* of the three-sided frame 21 on the lobby, also displays the first light in the other region 21*a* on the three-sided frame 21, and generates information about the user on a wheelchair on the doors 22 depending on the position of the car with respect to the distance between the position of the car at the time of responding to the call and the calling floor. The control means 2 then displays the generated guidance information on the three-sided frame 21 and the doors 22 in the lobby of the calling floor with the display device 7 via the display means 4 (S28) (FIG. 5-3A).

Information indicating that the car has reached the floor immediately before the calling floor (the car has reached a position closer to the calling position than a preset position) is then input from the car moving device 6. In response to that, the control means 2 determines, from the information about the user, whether the user on a wheelchair is going to get off on the calling floor (S29). If the user on a wheelchair is going to get off on the calling floor, guidance information is generated for displaying, on the doors 22, a moving image indicating that the wheelchair symbol displayed on the doors 22*b* moves to a position on the floor 24, and for displaying the position of the car on the three-sided frame 21*b*. The control means 2 then displays the guidance information on the three-sided frame 21 and the doors 22 in the lobby of the calling floor with the display device 7 via the display means 4 (S30) (FIG. 5-3B).

Information indicating that the car has arrived at the calling floor is then input from the car moving device 6 to the control means 2. In response to that, the control means 2 generates guidance information for displaying the entire surface 21*b* of the three-sided frame 21 with the second light, displaying a moving image indicating that the wheelchair symbol moves from the doors 22 to the floor 24, and displaying the region required for the user on a wheelchair to get off the car on the floor 24 in front of the doors 22. The control means 2 then displays the guidance information on the three-sided frame 21, the doors 22, and the floor 24 in front of the doors 22 in the lobby of the calling floor, with the display device 7 via the display means 4 (S31) (FIG. 5-3C).

If the user on a wheelchair is not going to get off on the calling floor, and the user on a wheelchair remains in the car, a wheelchair symbol is displayed at the upper right portion 22*b* of the doors 22, and guidance information indicating the position and the arrival direction of the car is displayed on the three-sided frame 21.

If there is no user on a wheelchair, guidance information indicating the position and the arrival direction of the car is displayed on the three-sided frame 21.

Further, in a case where the control means 2 has acquired the information about the destination of the user on a wheelchair from the input device 5 such as smartphone or a board registering device being carried by the user via the input means 3 when the car arrives at the calling floor, guidance information may be generated for displaying the region required for the user on a wheelchair on the floor 24*b* and displaying an arrow indicating the destination of the user on a wheelchair in S30 (FIG. 5-3D).

Information indicating that the doors are open is then input from the car moving device 6 to the control means 2 immediately before (a preset time before) the doors open. In response to that, the control means 2 generates guidance information for causing the second light displayed on the three-sided frame 21 to blink. In a case where the region required for the user on a wheelchair and the destination of the user are also displayed on the floor 24, the display is included in the guidance information. Guidance information for hiding the display of the arrival direction of the car displayed on the wall 23*a* is also included. With the display device 7 via the display means 4, the control means 2 displays the guidance information on the three-sided frame 21, the doors 22, and the floor 24 at the entrance from the lobby in the lobby of the calling floor, and hides the guidance information on the wall 23*a* (S32).

Note that, instead of displaying the second light in a blinking manner on the three-sided frame 21, it is possible to emphasize the three-sided frame 21 by adjusting the brightness of the lighting equipment displaying the second light, as described in the first embodiment. Alternatively, it is possible to emphasize the three-sided frame 21 by displaying the second light so as to expand or contract to the regions of the doors 22, the wall 23, and the floor 24 around the three-sided frame 21.

Information indicating that the doors 22 are fully open is then input from the car moving device 6 to the control means 2. In response to that, the control means 2 generates guidance information for displaying the third light on the entire surface of the three-sided frame 21. In a case where the region required for the user on a wheelchair to get off the car and the destination of the user are also displayed on the floor 24, the display is included in the guidance information. The control means 2 then displays the guidance information on the three-sided frame 21 in the lobby of the calling floor with the display device 7 via the display means 4 (S33).

Information indicating that the doors 22 are closed is then input from the car moving device 6 to the control means 2 immediately before (a preset time before) the doors 22 close. In response to that, the control means 2 generates guidance information for displaying the fourth light in a blinking manner on the entire surface of the three-sided frame 21. In a case where the region required for the user on a wheelchair to get off the car and the destination of the user are also displayed on the floor 24, the display is included in the guidance information. The control means 2 then displays the fourth light in a blinking manner on the entire surface of the three-sided frame 21 with the display device 7 via the display means 4 (S34). Information indicating that the doors 22 are closed is then input from the car moving device 6 to the control means 2. In response to that, the control means 2 hides the display of the fourth light.

Note that, instead of displaying the fourth light in a blinking manner, it is possible to emphasize the fourth light on the three-sided frame 21 by adjusting the brightness of the lighting equipment displaying the fourth light. Alternatively, it is possible to emphasize the three-sided frame 21 by displaying the fourth light so as to expand or contract to the regions of the wall 23 and the floor 24 around the three-sided frame 21.

As described above, in a case where there is a user on a wheelchair in an elevator car while the sequence of operation of the elevator including the position of the lobby of the car responding to a call, movement of the car, the arrival direction of the car, and opening and closing of the doors is displayed as guidance on the three-sided frame, the information is displayed as guidance on the doors, and the region required for the user on a wheelchair to get off the car is displayed on the floor in front of the doors when the user on a wheelchair gets off the car. Therefore, the user in the lobby can recognize that there is the user on a wheelchair in the car responding to the call at a time as early as the time the called car is selected, and intuitively recognize the region required for the user on a wheelchair to get off the car, even before the doors open. Further, as the moving direction in which the user on a wheelchair is to move after getting off the car is shown to the user on a wheelchair, the user on a wheelchair can move in the intended direction without getting lost after getting off the car.

Note that, in the above description, the guidance information about the user on a wheelchair to be displayed on the doors is displayed as the necessary information about the user on a wheelchair when the car is selected, when the car is about to arrive, and when the car arrives. However, the guidance information may be displayed at one of those times.

Third Embodiment

In the above described second embodiment, in a case where there is a user on a wheelchair in an elevator car when the car responding to a call is selected, the movement and the arrival direction of the car are indicated on the three-sided frame 21, and, at the same time, information about the user on a wheelchair is displayed on the doors 22 and the floor 24 in front of the doors 22. On the other hand, a third embodiment concerns an example of display of information on the doors 22 about the inside of the car including a congestion situation such as the number of persons in the car from information about users or sensor information, as well as display of guidance information on the three-sided frame 21 in conjunction with the movement and the arrival direction of the car.

The functional configuration diagram and the hardware configuration diagram of the guiding device 1 are the same as those of the first embodiment.

FIG. 7 is an example of display by the guiding device 1 according to the third embodiment of the present invention.

FIG. 7-1 shows the state of the lobby when there is no call. As in FIG. 3-1, in the lobby, there are the three-sided frame 21, the doors 22, the wall 23 above the three-sided frame 21, and the floor 24 in front of the doors 22 in the lobby.

When information about a call is input to the input device 5 by a user of the elevator, the information about the call is transmitted from the input device 5 to the guiding device 1 and the car moving device 6. The car moving device 6 then selects the car responding to the call. The first light is displayed as guidance information about the car responding to the call on the entire surface 21*a* of the three-sided frame 21 of the calling floor, as shown in FIG. 7-2A, 7-2B1, or 7-2B2.

Further, when information about the passenger(s) in the car responding to the call is input to the guiding device 1 by a sensor or user registration, the situation inside the car, including information indicating whether the user is going to get off on the calling floor and information about the congestion in the car, such as the number of persons in the car, is displayed on the doors 22. The arrival direction of the car is also displayed in the form of a symbol, a moving image, or the like on the wall 23 above the three-sided frame 21.

In a case where a passenger is going to get off the car on the calling floor, for example, information about the passenger to be displayed on the doors 22 is displayed as a large symbol or silhouette representing a person and the text "getting off", or a moving image in which a person is getting off the car, at the center of the doors 22 as shown in FIG. 7-2A. With such display, the user in the lobby for the car responding to the call can intuitively recognize that there is a person who is about to get off in the car responding to the call, when noticing that the car is coming. Note that the symbol indicating that there is a person about to get off the car is displayed as a symbol representing one person in this example even if there are two or more passengers. However, a symbol or silhouette showing the number of persons about to get off the car may be displayed, or some other form of display may be adopted, as long as one can recognize that at least a person is getting off the car.

Further, in a case where there are three passengers, and no one is going to get off the car on the calling floor, a symbol representing the persons in a small size is displayed at the upper right portion of the doors 22 as shown in FIG. 7-2B1. Also, in a case where there are two passengers, and no one is going to get off the car on the calling floor, a symbol representing the persons in a small size is displayed at the upper right portion of the doors 22 as shown in FIG. 7-2B2. With such display, the user in the lobby for the car responding to the call can intuitively recognize the existence of the passengers in the car responding to the call and the congestion situation, when noticing that the car is coming.

In a case where the car responding to the call starts moving, and a passenger in the car is going to get off on the calling floor, the second light is displayed on the three-sided frame 21*b* in conjunction with the relative position and the arrival direction of the car, and guidance information for displaying a symbol indicating the arrival direction with the second light is displayed on the wall 23, with information about the passenger being displayed at the center 22*a* of the doors 22, as shown in FIG. 7-3A Note that the information about the passenger to be displayed on the doors 22 may be displayed with the same light as the light displayed on the three-sided frame 21, or may be displayed with a different light.

Further, when the car reaches a position close to the calling floor, the second light is displayed in the region of the three-sided frame 21 in conjunction with the relative position and the arrival direction of the car, and guidance information for displaying a symbol indicating the arrival direction of the car with the second light is displayed on the wall 23, with information about the passengers being displayed on the doors 22, as shown in FIG. 7-3B. In this example, when the position of the car becomes close to the calling floor, a symbol, a silhouette, or the like that shows the number of persons about to get off the car or the proportion of the persons about to get off the car is displayed as user information on the door 22*c*. The display of the persons about to get off the car is also displayed in conjunction with the position and the arrival direction of the car, like the display on the three-sided frame 21. That is, guidance information showing the situation in the car approaching the door 22*c* as if the inside could be seen through the doors is displayed on the door 22*c*. A symbol or silhouette indicating the number of the persons in the car or the proportion of the persons in the car is displayed in a moving image so that the symbol or silhouette stands on the floor 24 when the car arrives. Thus, the user in the lobby can intuitively recognize the situation of the passengers who are about to get off the car.

Further, when the position of the car approaches the calling floor, information about the passengers who are not going to get off the car on the calling floor may also be displayed on the doors 22. In that case, of the symbol or silhouette showing the number or the proportion of the persons shown in FIG. 7-3B, the symbol or silhouette showing the number or the proportion of the passengers who are going to get off the car on the calling floor may be displayed in the front with a light in a bright color, and the symbol or silhouette showing the number or the proportion of the persons who are not going to get off the car on the calling floor may be displayed in the back with a light in a pale color. With such display, the user in the lobby can intuitively recognize the number of persons getting off the car when the car responding to the call arrives, and can also intuitively recognize the congestion situation in the car with the passengers who are not going to get off the car.

Further, when the position of the car approaches the calling floor, the relative position of the car may be displayed on the three-sided frame 21 while the information about the passengers who are not going to get off the car on the calling floor remains displayed at an upper right portion of the doors 22 as shown in FIGS. 7-2B1 and 7-2B2. With such display, the user in the lobby can intuitively recognize the degree of congestion in the elevator car.

In a case where the arrival direction of the car is a direction from below, for example, when the car arrives at the calling floor, the passengers arrive at doors 22*d* from under the floor, and are displayed in the front of the doors 22*d* as if standing on the floor 24, and the second light is displayed on the entire surface of the three-sided frame 21, as shown in FIG. 7-3C.

Note that the display on the doors 22 shown in FIGS. 7-3B and 7-3C may differ from the above, as long as the person getting off the car can be distinguished from the persons not getting off the car.

Immediately before the doors 22 open after the car arrives at the calling floor and while the doors 22 are opening, the second light is displayed in a blinking manner on the three-sided frame 21, and, at the same time, user information about the passengers and guidance information indicating the situation inside the car are displayed on the doors 22, as shown in FIGS. 3-4A and 3-4B of the first embodiment.

The display of the guidance information during the time since the doors 22 fully open until the doors 22 close is the same as the display shown in FIGS. 3-5 and 3-6. Alternatively, the display on the three-sided frame may be the same as the display shown in FIGS. 3-5 and 3-6, while the situation in the elevator car is displayed on the doors 22 during the time since the doors fully open until the doors 22 close.

The above is the description of an example of display by the guiding device 1 according to the third embodiment.

Next, operation of the guiding device 1 is described, with reference to a flowchart.

Figure 8:
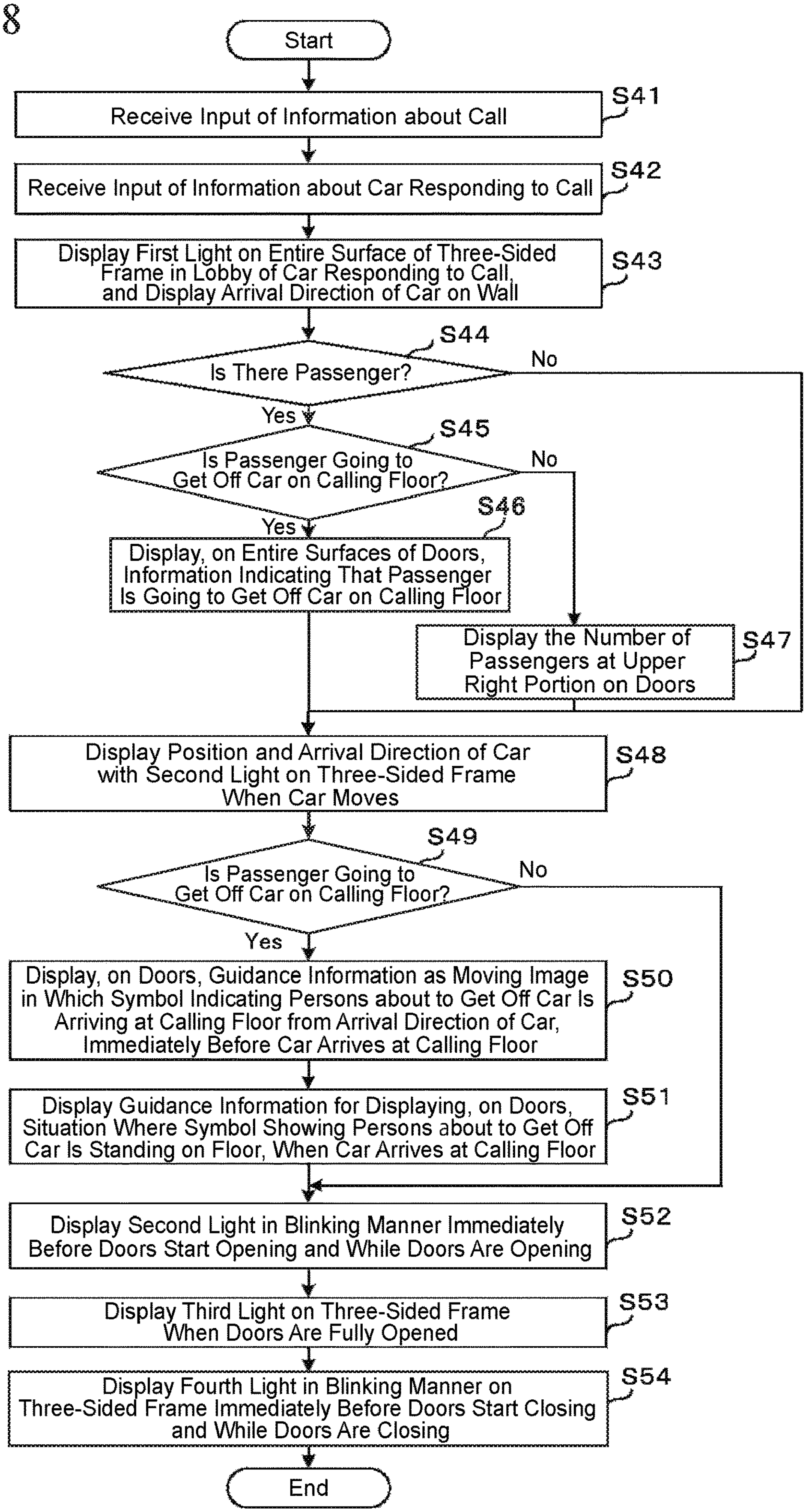
FIG. 8 is a flowchart showing an operation of the guiding device 1 according to the third embodiment of the present invention.

FIG. 8 is a flowchart showing the operation of the guiding device 1 according to the third embodiment of the present invention.

First, when information about a call is input from the input device 5 by a user of the elevator, the information about the call is input from the input device 5 to the input means 3 of the guiding device 1 as in the first embodiment (S41). At the same time, the information about the call is also input from the input device 5 to the car moving device 6.

The car moving device 6 then selects the car responding to the call depending on the information about the call, and information including the car number and the position of the car responding to the call is input from the car moving device 6 to the control means 2 of the guiding device 1 (S42).

The control means 2 then generates guidance information for displaying the first light on the entire surface 21*a* of the three-sided frame 21 in the lobby corresponding to the car number of the car responding to the call, and indicating the arrival direction of the car on the wall 23. The control means 2 then displays the generated guidance information on the three-sided frame 21*a* and the wall 23*a* with the display device 7 via the display means 4 (S43).

The control means 2 further determines whether there is a passenger in the car responding to the call, using user information input from the input device 5 via the input means 3, or sensor information and image information about the inside of the car input from the car moving device 6 (S44). The user information may be input from the car moving device 6 to the control means 2 in some cases. Information about the sensor that detects the inside of the car and information about an image capturing the inside of the car may be input from the car moving device 6 to the control means 2, and the control means 2 may determine whether there is a passenger in the car.

The control means 2 further determines whether the passenger is going to get off the car on the calling floor, using the user information (S45).

If there is a passenger in the car responding to the call, and the passenger is going to get off the car on the calling floor, the control means 2 displays the first light on the entire surface 21*a* of the three-sided frame 21, displays the arrival direction of the car on the wall 23*a,* and generates guidance information for displaying a symbol or silhouette of a person and the text "getting off" at the center of the entire surface 22*a* of the doors 22, as shown in FIG. 7-2A. The display on the doors 22 may be display of any kind as long as the display clearly shows that the passenger is going to get off the car on the calling floor, or may be a moving image. The control means 2 then displays the guidance information on the three-sided frame 21, the doors 22, and the wall 23, with the display device 7 via the display means 4 (S46).

If there is a passenger in the car responding to the call, and the passenger is not going to get off the car on the calling floor, on the other hand, the control means 2 displays the first light on the entire surface 21*a* of the three-sided frame 21, displays the arrival direction of the car on the wall 23*a,* and generates guidance information for displaying the number or the proportion of the passengers at an upper right portion of the doors 22. For example, if there are three passengers, the control means 2 generates guidance information for displaying the three passengers at an upper right portion 22*b*1 of the doors 22, as shown in FIG. 7-2B1. If there are two passengers, for example, the control means 2 generates guidance information for displaying the two passengers at an upper right portion 22*b*2 of the doors, as shown in FIG. 7-2B2. The control means 2 then displays the guidance information on the three-sided frame 21, the doors 22, and the wall 23, with the display device 7 via the display means 4 (S47). Although the congestion situation in the car is indicated by the number of the passengers in FIG. 7-2B, the congestion situation in the car may be indicated by the proportion of the passengers.

Information indicating that the car responding to the call moves is then input as the position of the car from the car moving device 6 to the control means 2. In response to that, the control means 2 generates guidance information for displaying the partial region 21*b* of the three-sided frame 21 with the second light and displaying the other region 21*a* with the first light, depending on the position of the car with respect to the distance between the position of the car at the time the car responded to the call and the calling floor, and the arrival direction of the car. Further, guidance information for displaying information about the passengers on the doors 22*a* is also generated, with a symbol indicating the arrival direction of the car being displayed on the wall 23*a.* The control means 2 then displays the generated guidance information on the three-sided frame 21, the doors 22, and the wall 23 in the lobby of the calling floor, with the display device 7 via the display means 4 (S48) (see FIG. 7-3A).

The control means 2 then determines whether there is a passenger about to get off the car on the calling floor, using the user information (S49).

If information indicating that the car has reached a preset position with respect to the position of the calling floor is input from the car moving device 6 to the control means 2, and it is determined that a passenger is going to get off the car on the calling floor, guidance information is generated for displaying the position and the arrival direction of the car with the second light in the region 21*b* on the three-sided frame 21, and displaying the first light in the other region 21*a.* Further, the arrival direction of the car is displayed on the wall 23*a,* and guidance information is generated for emphasizing the situation in the car with a moving image in which a symbol or silhouette representing the number or the proportion of the passengers displayed on the doors 22*c* is arriving at the calling floor, in conjunction with the position and the arrival direction of the car. The control means 2 then displays the generated guidance information on the three-sided frame 21, the doors 22, and the wall 23 (S50) (FIG. 7-3B). Further, in the above described example, the number or the proportion of the passengers in the car is displayed in a moving image in conjunction with the movement of the car when the car is approaching the calling floor. However, a still image may be adopted.

If information indicating that the car has arrived at the calling floor is input from the car moving device 6 to the control means 2, and a passenger is going to get off the car on the calling floor, guidance information for displaying the second light on the entire surface of the three-sided frame 21*b* is generated. Further, the arrival direction of the car is displayed on the wall 23*a,* and guidance information is generated for displaying, on the doors 22*d,* the symbol or silhouette representing the passengers displayed on the doors 22 as if the passengers were standing on the floor 24, to indicate that the passengers have arrived at the calling floor. The control means 2 then displays the generated guidance information on the three-sided frame 21, the doors 22, and the wall 23 (S51) (FIG. 7-3C).

At this point of time, the guidance information displayed on the doors 22*d* is displayed so that the situation of the passengers in the car can be seen through the doors 22 in the above described example. However, display of some other kind may be adopted, as long as the situation of the passengers in the car can be indicated in conjunction with the situation of the arrival of the car. Some other display method may be adopted, as long as at least the situation of the passengers in the car can be indicated.

If any passenger is not going to get off the car on the calling floor, on the other hand, the control means 2 displays the second light in the region of the three-sided frame 21*b* in conjunction with the position and the arrival direction of the car, displays the first light in the other region 21*a* as described in the first embodiment, and also generates guidance information for displaying information about the passengers displayed on the doors 22. The guidance information also includes guidance information indicating the arrival direction of the car displayed on the wall 23. The control means 2 then displays the generated guidance information on the three-sided frame 21, the doors 22, and the wall 23, with the display device 7 via the display means 4.

Note that, as disclosed in the description of display, the situation inside the car including the situation of the passengers who are not going to get off the car may be displayed, together with the passenger who is going to get off the car, on the doors 22.

Information indicating that the doors 22 are open is then input from the car moving device 6 to the control means 2 immediately before (a preset time before) the doors 22 open. In response to that, the control means 2 generates guidance information for causing the second light displayed on the three-sided frame 21 to blink and guidance information for hiding the display of the arrival direction of the car on the wall 23, displays the generated guidance information with the second light in a blinking manner on the three-sided frame 21, and hides the guidance information on the wall 23 (S52).

Note that, instead of displaying the second light in a blinking manner on the three-sided frame 21, it is possible to emphasize the three-sided frame 21 by adjusting the brightness of the lighting equipment displaying the second light, as described in the first embodiment. Alternatively, it is possible to emphasize the three-sided frame 21 by displaying the second light so as to expand or contract to the regions of the doors 22, the wall 23, and the floor 24 around the three-sided frame 21.

Information indicating that the doors 22 are fully open is then input from the car moving device 6 to the control means 2. In response to that, the control means 2 generates guidance information for displaying the third light on the entire surface of the three-sided frame 21, and displays the generated guidance information on the entire surface of the three-sided frame 21 with the third light (S53).

Information indicating that the doors 22 are closed is then input from the car moving device 6 to the control means 2 immediately before (a preset time before) the doors 22 close. In response to that, the control means 2 generates guidance information for displaying the fourth light in a blinking manner on the entire surface of the three-sided frame 21, and displays the generated guidance information with the fourth light in a blinking manner on the entire surface of the three-sided frame 21 (S54). Information indicating that the doors 22 are closed is then input from the car moving device 6 to the control means 2. In response to that, the control means 2 hides the display of the fourth light.

Note that, instead of displaying the fourth light in a blinking manner, it is possible to emphasize the fourth light on the three-sided frame 21 and the doors 22 by adjusting the brightness of the lighting equipment displaying the fourth light. Alternatively, it is possible to emphasize the three-sided frame 21 by displaying the fourth light so as to expand or contract to the regions of the wall 23 and the floor 24 around the three-sided frame 21.

As described above, the sequence of operation of the elevator, including the position of the lobby for the car responding to a call, the movement of the car, the arrival direction of the car, and opening and closing of the doors, is displayed as guidance on the three-sided frame. At the same time, information about the inside of the car, such as information indicating whether there is a passenger in the car responding to the call depending on information about a user in the car, the congestion situation determined from the number or the proportion of the passengers, and information indicating whether a passenger is going to get off the car on the calling floor, is displayed on the doors. Thus, the user in the lobby of the calling floor can intuitively recognize the situation inside the car, at a time as early as the time when the car is selected. Further, when the car approaches the calling floor, the situation inside the car is displayed in an emphasized manner on the doors. Thus, the user in the lobby can intuitively recognize the situation inside the car, as well as the situation of movement of the car.

Fourth Embodiment

In the example described in the third embodiment, the situation inside an elevator car, including a congestion situation such as the number or the proportion of the persons in the car determined from information about users or information about a sensor, is displayed on the doors, in conjunction with guidance information about the position and the arrival direction of the car displayed on the three-sided frame 21. On the other hand, a fourth embodiment concerns an example in which information about a person or the like in an elevator car is displayed on the doors, and information indicating that the person in the car is going to get off the car on the calling floor is also displayed on the floor 24.

The functional configuration diagram and the hardware configuration diagram of the guiding device 1 are the same as those of the first embodiment.

FIG. 9 is an example of display by the guiding device 1 according to the fourth embodiment of the present invention.

FIG. 9-1 shows the state of the lobby when there is no call. As in FIG. 3-1, in the lobby, there are the three-sided frame 21, the doors 22, the wall 23 above the three-sided frame, and the floor 24 in front of the doors 22 in the lobby.

When information about a call is input to the input device 5 by a user of the elevator, the information about the call is transmitted from the input device 5 to the guiding device 1 and the car moving device 6. The car moving device 6 then selects the car responding to the call. The first light is then displayed as guidance information about the car responding to the call on the entire surface 21*a* of the three-sided frame 21 in the lobby of the calling floor, as shown in FIG. 9-2A, 9-2B1, or 9-2B2.

Further, in a case where information about a passenger in the car responding to the call has been input to the guiding device 1 by a sensor or user registration when the car is selected, information indicating that the passenger is going to get off the car on the calling floor, and passenger information such as the number or the proportion of the persons in the car is displayed with a symbol or silhouette of persons on the doors 22. The display in this situation is the same as the display in the third embodiment. The arrival direction of the car is also displayed with the first light on a wall 23*a* above the three-sided frame 21.

In a case where the car starts moving, and the passenger is going to get off the car on the calling floor, the relative position and the arrival direction of the car are displayed with the second light in the region 21*b* of the three-sided frame 21 while guidance information about the passenger shown in FIG. 9-2A is displayed at the center 22*a* of the doors 22, as shown in FIG. 9-3A. The first light is also displayed in the other region 21*a* of the three-sided frame. Further, when the position of the car approaches the calling floor, a moving image in which a symbol or silhouette of the person displayed on the doors 22 moves to the floor is displayed as guidance information, to indicate that the passenger is going to get off the car on the calling floor, as shown in FIG. 9-3B.

When the car arrives at the calling floor, a moving image in which the symbol or silhouette of the person shown on the doors 22 moves from the doors 22 onto the floor 24*a* is displayed. The region for the passenger to get off the car is also displayed on the floor 24*a*, and the second light is displayed on the entire surface of the three-sided frame 21, as shown in FIG. 9-3C. Note that the arrival direction of the car is displayed with the first light on the wall 23*a* above the three-sided frame 21 until the car moves and arrives at the calling floor.

The display of the guidance information on the three-sided frame 21 during the time from immediately before the doors 22 open until the doors 22 are fully opened and then closed is the same as the display shown in FIGS. 3-4, 3-5, and 3-6. In a case where there is a passenger in the car, the guidance information is displayed on the doors 22.

The above is the description of an example of display by the guiding device 1 according to the fourth embodiment.

Next, operation of the guiding device 1 is described, with reference to a flowchart.

Figure 10:
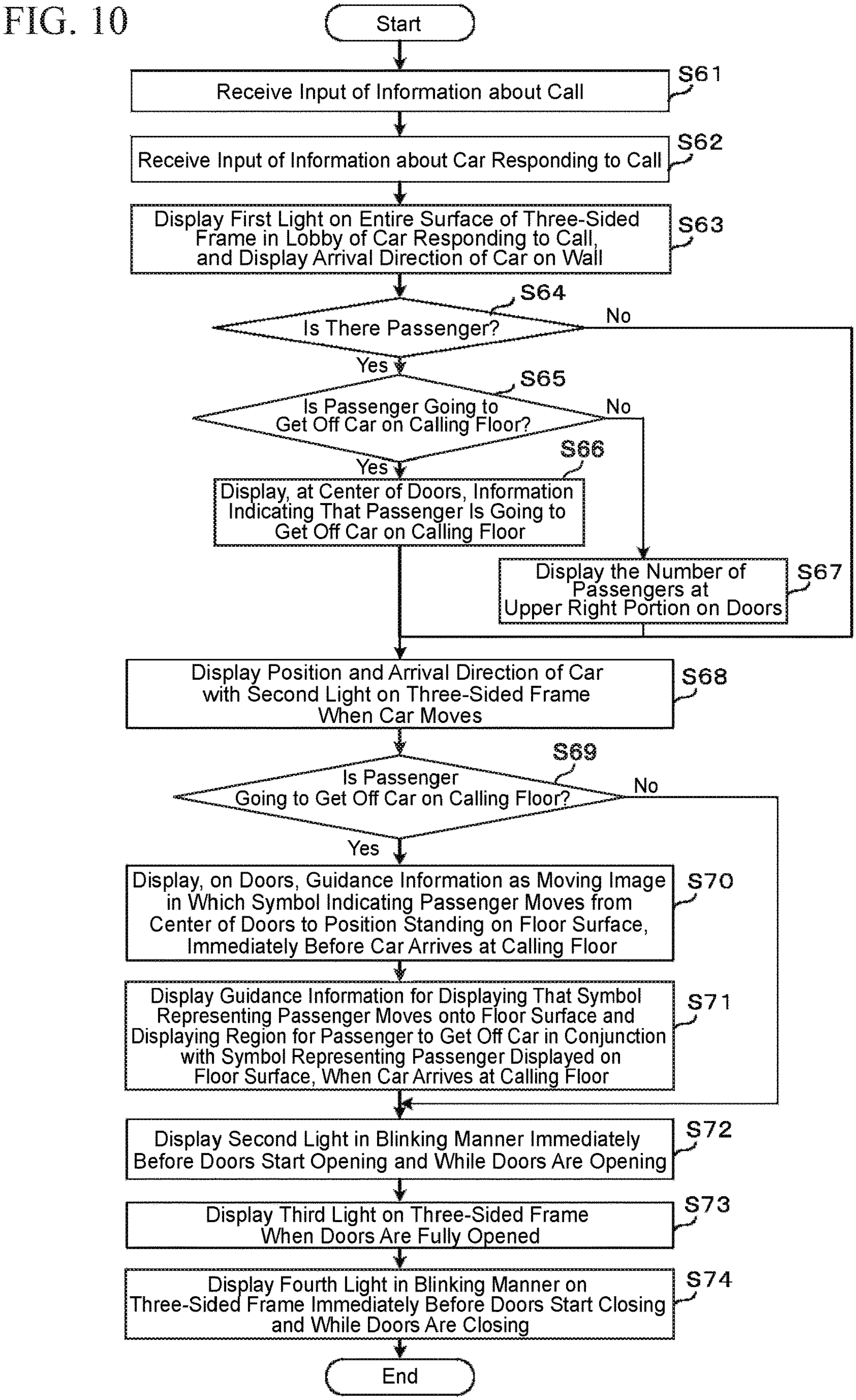
FIG. 10 is a flowchart showing an operation of the guiding device 1 according to the fourth embodiment of the present invention.

FIG. 10 is a flowchart showing the operation of the guiding device 1 according to the fourth embodiment of the present invention.

A user calls for the elevator, and the first light is displayed on the entire surface of the three-sided frame 21 in the lobby for the car responding to the call. The arrival direction of the car is displayed on the wall 23, and information about the passenger(s) in the car is displayed on the doors 22. These operations are the same as the corresponding operations in the third embodiment.

First, when information about a call is input from the input device 5 by a user of the elevator, the information about the call is input from the input device 5 to the input means 3 of the guiding device 1 (S61). At the same time, the information about the call is also input from the input device 5 to the car moving device 6.

The car moving device 6 then selects the car responding to the call depending on the information about the call, and information including the car number and the position of the car responding to the call is input from the car moving device 6 to the control means 2 of the guiding device 1 (S62).

The control means 2 then generates guidance information for displaying the first light on the entire surface 21*a* of the three-sided frame 21 in the lobby corresponding to the car number of the car responding to the call, and indicating the arrival direction of the car on the wall 23. The control means 2 then displays the generated guidance information on the three-sided frame 21*a* and the wall 23*a* with the display device 7 via the display means 4 (S63).

The control means 2 further determines whether there is a passenger in the car responding to the call, using user information input from the input device 5 via the input means 3, or sensor information and image information about the inside of the car input from the car moving device 6 (S64). The user information may be input from the car moving device 6 to the control means 2 in some cases.

The control means 2 further determines whether the passenger is going to get off the car on the calling floor, using the user information (S65).

If there is a passenger in the car responding to the call, and the passenger is going to get off the car on the calling floor, the control means 2 displays the first light on the entire surface 21*a* of the three-sided frame 21, and generates guidance information for displaying a symbol or silhouette of a person and the text "getting off" at the center of the entire surface 22*a* of the doors 22, as shown in FIG. 9-2A. Display of the arrival direction of the car displayed on the wall 23*a* is also included in the guidance information.

Note that the display on the doors 22 may be display of any kind as long as the display clearly shows that the passenger is going to get off the car on the calling floor, or may be a moving image.

The control means 2 then displays the guidance information on the three-sided frame 21, the doors 22, and the wall 23, with the display device 7 via the display means 4 (S66).

If there is a passenger in the car responding to the call, and the passenger is not going to get off the car on the calling floor, on the other hand, the number or the proportion of the passengers is displayed at an upper right portion of the doors 22. For example, if there are three passengers, the control means 2 generates guidance information for displaying the three passengers at the upper right portion 22*b*1 of the doors 22, as shown in FIG. 9-2B1. If there are two passengers, for example, the control means 2 generates guidance information for displaying the two passengers at the upper right portion 22*b*2 of the doors, as shown in FIG. 9-2B2. The control means 2 then displays the guidance information at the upper right portion 22*b* of the doors 22 with the display device 7 via the display means 4 (S67).

If there are no passengers in the car responding to the call, any guidance information is not displayed on the doors 22, but the process described below is performed. If there is a passenger, on the other hand, the process described below is performed, including guidance information for displaying the passenger(s) displayed on the doors 22 in S66 or S67.

Information indicating that the car responding to the call moves is then input as the position of the car from the car moving device 6 to the control means 2. In response to that, the control means 2 generates guidance information for displaying the partial region 21*b* of the three-sided frame 21 in the lobby on the calling floor with the second light and displaying the other region 21*a* with the first light, depending on the position of the car with respect to the distance between the position of the car at the time the car responded to the call and the calling floor, and the arrival direction of the car. Further, if there is a passenger in the car, guidance information for displaying information about the passenger on the doors 22*a* and displaying the arrival direction of the car on the wall 23*a* is generated. The control means 2 then displays the generated guidance information on the three-sided frame 21, the doors 22, and the wall 23 in the lobby of the calling floor, with the display device 7 via the display means 4 (S68) (see FIG. 9-3A).

The control means 2 then determines whether there is a passenger about to get off the car on the calling floor, from user information (S69).

In a case where a passenger is going to get off the car on the calling floor, when information indicating that the car has reached a preset position with respect to the position of the calling floor is input from the car moving device 6 to the control means 2, guidance information is generated for displaying on the doors 22 a moving image in which a symbol or silhouette representing the passenger moves from the center of the doors 22 to a position standing on the floor. Further, guidance information is generated for displaying the position of the car with the second light in the region 21*b* of the three-sided frame 21, and displaying the arrival direction of the car on the wall 23*a*. The control means 2 then displays the generated guidance information on the three-sided frame 21, the doors 22, and the wall 23 (S70) (FIG. 9-3B).

In a case where a passenger is going to get off the car on the calling floor, when information indicating that the car has arrived at the calling floor is input from the car moving device 6 to the control means 2, guidance information is generated for moving the symbol or silhouette of the passenger displayed on the doors 22 to the floor 24, and displaying the symbol or silhouette together with the region required for the passenger to get off the car on the floor 24. Further, guidance information for displaying the second light shown in the region 21*b* of the three-sided frame 21 on the entire surface, and displaying the arrival direction of the car on the wall 23*a* is generated. The control means 2 then displays the generated guidance information on the three-sided frame 21, the doors 22, and the wall 23 (S71) (FIG. 9-3C).

If there is a passenger, and the passenger is not going to get off the car on the calling floor, guidance information for displaying the position and the arrival direction of the car with the second light in the region 21*b* of the three-sided frame 21 while the passenger displayed on the doors 22 remains displayed is generated and displayed.

If there are no passengers, on the other hand, guidance information for displaying the position and the arrival direction of the car with the second light in the region 21*b* of the three-sided frame 21 is generated and displayed.

Information indicating that the doors 22 are open is then input from the car moving device 6 to the control means 2 immediately before (a preset time before) the doors 22 open. In response to that, the control means 2 generates guidance information for causing the second light displayed on the three-sided frame 21 to blink (S72).

Note that, instead of displaying the second light in a blinking manner on the three-sided frame 21, it is possible to emphasize the three-sided frame 21 by adjusting the brightness of the lighting equipment displaying the second light, as described in the first embodiment. Alternatively, it is possible to emphasize the three-sided frame 21 by displaying the second light so as to expand or contract to the regions of the doors 22, the wall 23, and the floor 24 around the three-sided frame 21.

Information indicating that the doors 22 are fully open is then input from the car moving device 6 to the control means 2. In response to that, the control means 2 generates guidance information for displaying the third light on the entire surface of the three-sided frame 21 (S73).

Information indicating that the doors 22 are closed is then input from the car moving device 6 to the control means 2 immediately before (a preset time before) the doors 22 close. In response to that, the control means 2 generates guidance information for displaying the fourth light in a blinking manner on the entire surface of the three-sided frame 21 (S74). Information indicating that the doors 22 are closed is then input from the car moving device 6 to the control means 2. In response to that, the control means 2 hides the display of the fourth light.

Note that, instead of displaying the fourth light in a blinking manner, it is possible to emphasize the fourth light on the three-sided frame 21 and the doors 22 by adjusting the brightness of the lighting equipment displaying the fourth light. Alternatively, it is possible to emphasize the three-sided frame 21 by displaying the fourth light so as to expand or contract to the regions of the wall 23 and the floor 24 around the three-sided frame 21.

As described above, the sequence of operation of the elevator, including the position of the lobby for the car responding to a call, the movement of the car, the arrival direction of the car, and opening and closing of the doors, is displayed as guidance on the three-sided frame 21. At the same time, a situation where a passenger gets off the car is displayed on the doors and the floor in front of the doors, depending on information about the user in the car. Thus, the user in the lobby on the calling floor can intuitively recognize whether there is a passenger in the car responding to the call, and whether the passenger is going to get off the car, at a time as early as the time when the car is selected.

As the region required for a passenger to get off the car is displayed on the floor when the doors open, the user in the lobby can intuitively recognize the sequence of operation of the elevator, and also intuitively determine that there is the need to keep the region for a passenger to get off the car so that the user in the lobby will not collide with the passenger getting off the car when the user in the lobby hastily gets into the car.

Further, the user in the lobby cannot tell the situation in the car behind the doors before the doors open. However, as the situation inside the car is displayed on the doors before the doors open, the user in the lobby can be caring and considerate. Also, as the situation inside the car is displayed on the doors before the doors open, a person in the lobby can act not to hinder the person getting off the car, and thus, getting into and getting off the car becomes smoother.

Note that the sequence of operation of the elevator, including the position of the lobby for the car responding to a call, the state of the car responding to the call, and the opening/closing state of the doors in the lobby, is continuously displayed with light on the three-sided frame in the lobby of the car responding to the call or on the periphery of the three-sided frame in the embodiments. However, the respective states in the sequence of operation of the elevator may be intermittently or fragmentarily displayed with light.

Alternatively, when guidance information is displayed, light as the guidance for the sequence of operation of the elevator may be displayed not on the three-sided frame but only on the floor around the three-sided frame serving as the entrance. Further, the light as the guidance for the sequence of operation of the elevator may be continuously displayed on either of both of the outer side and the inner side of the periphery of the three-sided frame, or the light as the guidance for the sequence of operation of the elevator may be continuously displayed only on the wall around the three-sided frame, or the light as the guidance for the sequence of operation of the elevator may be displayed only on the doors inside the three-sided frame. It is also possible to continuously display the sequence of operation of the elevator with light on any combination of the three-sided frame, the floor, the wall surrounding the three-sided frame, and the doors. Note that, in the above embodiments, information about the presence/absence of a user on a wheelchair determined from user information, the number or the proportion of users, and a person getting off the car on the calling floor, is displayed as information about passengers on the doors. However, a situation inside the car that can be determined from user information, such as the use of a baby stroller, a pet accompanying a person, large pieces of luggage being carried by a user, may be displayed on the doors 22.

INDUSTRIAL APPLICABILITY

As described above, in a guiding device according to the present invention, the sequence of operation of the elevator, including the position of the lobby corresponding to the car number of the car responding to a call, the position and the arrival direction of the car responding to the call, and the opening and closing of the doors, is displayed as guidance information on the three-sided frame in the lobby. Thus, a user can intuitively determine the state of the car responding to the call and the state of opening and closing of the door.

Further, information about the existence/absence of a user on a wheelchair, the existence/absence of a passenger, and whether the passenger is going to get off the car on the calling floor is displayed on the doors, with the use of user information. Thus, a user in the lobby can intuitively recognize the situation in the elevator car.

Further, information indicating that a passenger in the elevator car is going to get off the car on the calling floor is displayed on the doors and on the floor in front of the doors. Thus, a user in the lobby can intuitively recognize the region required for a person, or more particularly, a user on a wheelchair, to get off the car.

REFERENCE SIGNS LIST

1: Guiding device, 2: Control means, 3: Input means, 4: Display means, 5: Input device, 6: Car moving device, 7: Display device, 11: Processor, 12: Memory, 13: Input/output interface, 21: Three-sided frame, 22: Doors, 23: Wall, 24: Floor.

The invention claimed is:

1. A guiding device, comprising:

a processor; and a memory storing instructions, upon executed by the processor, causing the processor to perform a process comprising:

generating guidance information for displaying a first light on a three-sided frame or on a periphery of the three-sided frame placed at an opening of entrance to a car responding to a call when the car responding to the call is selected, displaying a second light on the three-sided frame or the periphery of the three-sided frame making correspondence with a relative position of the car from a position of the car responding to the call to a calling floor and an arrival direction of the car when the car moves, and emphasizing to display the second light on the three-sided frame or on the periphery of the three-sided frame when the car responding to the call arrives at the calling floor and a door in a lobby of the car responding to the call is opened, using operation information of the car responding to the call of an elevator and open/close information of the door of the elevator which are input from a car moving device controlling the car of the elevator; and outputting the guidance information to a display device displaying the guidance information.

2. A guiding device, comprising:

a processor; and a memory storing instructions, upon executed by the processor, causing the processor to perform a process comprising:

generating guidance information for displaying a first light on a three-sided frame or on a periphery of the three-sided frame making correspondence with a relative position of the car from a position of the car responding to the call to a calling floor and an arrival direction of the car when the car responding to the call moves, and emphasizing to display the first light on the three-sided frame or on the periphery of the three-sided frame when the car responding to the call arrives at the calling floor and a door in a lobby of the car responding to the call opens, and displaying a second light on the three-sided frame or on the periphery of the three-sided frame when the door fully opens, using operation information of the car responding to the call of an elevator and open/close information of the door of the elevator which are input from a car moving device controlling the car of the elevator; and outputting the guidance information to a display device displaying the guidance information.

3. A guiding device, comprising:

a processor; and a memory storing instructions, upon executed by the processor, causing the processor to perform a process comprising:

generating guidance information for displaying a first light on a three-sided frame or on a periphery of the three-sided frame when a car responding to a call is selected, displaying a second light on the three-sided frame or on the periphery of the three-sided frame making correspondence with a relative position of the car from a position of the car responding to the call to a calling floor when the car moves, emphasizing to display the second light on the three-sided frame or on the periphery of the three-sided frame when the car responding to the call arrives at the calling floor and a door of a lobby of the car responding to the call opens, displaying a third light on the three-sided frame or the periphery of the three-sided frame when the door fully opens, and emphasizing to display a fourth light on the three-sided frame or on the periphery of the three-sided frame when the door closes, using operation information of the car responding to the call of an elevator and open/close information of the door of the elevator which are input from a car moving device controlling the car of the elevator; and outputting the guidance information to a display device displaying the guidance information.

4. The guiding device according to claim 1, wherein the process generates the guidance information displaying the light continuously and displays a flow of a sequence of the elevator.

5. The guiding device according to claim 1, wherein the periphery of the three-sided frame is one or a combination of the door inside the three-sided frame, a floor around the three-sided frame, or a wall around the three-sided frame.

6. The guiding device according to claim 1, the process further comprising inputting information of a user who register the call, wherein the process generates the guidance information for deciding and displaying a situation inside the car on the door of the lobby of the car responding to the call according to information of the user.

7. The guiding device according to claim 6, wherein the process decides that the user on the car is a user on a wheelchair as a situation inside the car and generates the guidance information for displaying on the door of the lobby of the car a symbol and/or text indicating use of the wheelchair responding to the call when the car responding to the call is selected.

8. The guiding device according to claim 6, wherein when the process decides that a user on the car is a user on a wheelchair and the user on the wheelchair is to get off the car on the calling floor as a situation inside the car, the guidance information is generated for displaying a symbol and/or text on the door of the lobby of the car responding to the call when the car responding to the call arrives at the calling floor, that the user on the wheelchair gets off the car.

9. The guiding device according to claim 6, wherein when the process decides that the user on the car is a user on a wheelchair and the user on the wheelchair is to get off the car as a situation inside the car, the guidance information is generated for displaying a symbol and/or text from the door of the lobby of the car that the user on the wheelchair is getting off the car and indicating by symbol and/or text a region needed for the user on a wheelchair to get off the car, on the floor in front of the door when the car responding to the call arrives at the calling floor.

10. The guiding device according to claim 7, wherein the process further generates the guidance information for displaying a moving direction for the user on a wheelchair after the user on the wheelchair gets off the car.

11. The guiding device according to claim 6, wherein the process decides a number of persons inside the car as a situation of the car and generates the guidance information for displaying, on the door of the lobby corresponding to the car responding the call when the car is selected, an indication of a situation inside the car including the number or a proportion of persons inside the car.

12. The guiding device according to claim 6, wherein the process decides that the user on the car gets off the car on the calling floor as a situation inside the car and generates the guidance information for displaying, on the door of the lobby of the car responding to the call when the car responding to the call arrives at the calling floor, a situation that the user on the car gets off the car.

13. The guiding device according to claim 6, wherein the process deicides that the user on the car gets off the car as a situation inside the car and generates the guidance information for displaying, on the door of the lobby of the car responding to the call and on the floor in front of the door when the car responding to the car arrives at the calling floor, a situation that the user on the car gets off the car and a region in front of the car needed to get off the car.

14. A guiding method of a guiding device displaying guidance information at a lobby of an elevator, comprising:

generating the guidance information for displaying a first light on a three-sided frame or on a periphery of the three-sided frame placed at an opening of entrance of the car responding to the call when the car responding to the call is selected, displaying a second light on the three-sided frame or on the periphery of the three-sided frame making correspondence with a relative position of the car from a position of the car responding to the call to a calling floor and an arrival direction of the car when the car moves, and emphasizing to display the second light on the three-sided frame or on the periphery of the three-sided frame when the car responding to the call arrives at the calling floor and the door of the lobby of the car responding to the call opens, using operation information of the car responding to the call of the elevator and open/close information of the door of the elevator which are input from a car moving device controlling the car of the elevator; and outputting the guidance information to a display device displaying the guidance information.

15. An elevator comprising a guiding device; comprising:

a processor; and a memory storing instructions, upon executed by the processor, causing the processor to perform a process comprising:

controlling a car of an elevator;

generating guidance information for displaying a first light on a three-sided frame placed at an opening of entrance of the car responding to a call or on a periphery of the three-sided frame when the car responding to the call is selected, displaying a second light on the three-sided frame or on the periphery of the three-sided frame making correspondence with a relative position of the car from a position of the car responding to the car to a calling floor and an arrival direction of the car when the car moves, and emphasizing to display the second light on the three-sided frame or on the periphery of the three-sided frame when the car responding to the call arrives at the calling floor and a door of a lobby of the car responding to the call opens, using operation information of the car responding to the call of the elevator and open/close information of the door of the elevator which are input from the car moving device; and outputting the guidance information to a display device displaying the guidance information.

16. A guiding method of a guiding device displaying guidance information at a lobby of an elevator, comprising:

generating the guidance information for displaying a first light on a three-sided frame or on a periphery of the three-sided frame making correspondence with a relative position of a car from a position of the car responding to a call to a calling floor and an arrival direction of the car when the car responding to the call moves, emphasizing to display the first light on the three-sided frame or the periphery of the three-sided frame when the car responding to the car arrives at the calling floor and a door of the lobby of the car responding to the call opens, and displaying a second light on the three-sided frame or on the periphery of the three-sided frame when the door fully opens, using operation information of the car responding to the call of the elevator and open/close information of the door of the elevator which are input from a car moving device controlling the car of the elevator; and outputting the guidance information to a display device displaying the guidance information.

17. An elevator, comprising: a guidance device comprising:

a processor; and a memory storing instructions, upon executed by the processor, causing the processor to perform a process comprising:

controlling a car of the elevator;

generating guidance information for displaying a first light on a three-sided frame or on a periphery of the three-sided frame making correspondence with a relative position of the car from a position of the car responding to a call to a calling floor and an arrival direction of the car when the car responding to the call moves, emphasizing to display the first light on the three-sided frame or on the periphery of the three-sided frame when the car responding to the call arrives at a calling floor and a door of a lobby of the car responding to the call opens, and displaying a second light on the three-sided frame or on the periphery of the tree-sided frame when the door fully opens, using operation information of the car responding to the call of the elevator and open/close information of the door of the elevator which are input from the car moving device; and outputting the guidance information to a display device displaying the guidance information.

18. A guiding method of a guiding device displaying guidance information at a lobby of an elevator, comprising:

generating the guidance information for displaying a first light on a three-sided frame or on a periphery of the three-sided frame when a car responding to a call is selected, displaying a second on the three-sided frame or on the periphery of the three-sided frame making correspondence with a relative position of the car from a position of the car responding to the car to a calling floor and an arrival direction of the car when the car moves, emphasizing to display a second light on the three-sided frame or on the periphery of the three-sided frame when a door of a lobby of the car responding to the call opens, and displaying a third light on the three-sided frame or on the periphery of the three-sided frame when the door fully opens, and emphasizing to display a fourth light on the three-sided frame or on the periphery of the three-sided frame when the door closes, using operation information of the car responding to the call of the elevator and open/close information of the door of the elevator which are input from a car moving device controlling the car of the elevator; and outputting the guidance information to a display device displaying the guidance information.

19. An elevator comprising a guiding device, comprising:

a processor; and a memory storing instructions, upon executed by the processor, causing the processor to perform a process comprising:

controlling a car of an elevator;

generating the guidance information for displaying a first light on a three-sided frame or on a periphery of the three-sided frame when a car responding to a call is selected, displaying a second light on the three-sided frame or on the periphery of the three-sided frame making correspondence with a relative position of the car from a position of the car responding to the car to a calling floor and an arrival direction, emphasizing to display the second light on a three-sided frame or on the periphery of the three-sided frame when the car responding to the call arrives at a calling floor and a door of a lobby of the car responding to the call opens, displaying a third light on the three-sided frame or on the periphery of the three-sided frame when the door fully opens, and emphasizing to display a fourth light on the three-sided frame or on the periphery of the three-sided frame when the door closes, using operation information of the car responding to the call of the elevator and open/close information of the door of the elevator which are input from the car moving device; and outputting the guidance information to a display device displaying the guidance information.

* * * * *